United States Patent [19]

Ellner

[11] 4,047,006

[45] Sept. 6, 1977

[54] ELECTRONIC POSTAGE SCALE

[75] Inventor: Edwin Ellner, Oxford, Conn.

[73] Assignee: Better Packages, Inc., Shelton, Conn.

[21] Appl. No.: 652,843

[22] Filed: Jan. 27, 1976

[51] Int. Cl.$^2$ .................... G06F 15/02; G01G 23/42
[52] U.S. Cl. .............................. 235/151.33; 177/25; 364/900
[58] Field of Search ................ 235/151.33; 177/25, 177/58, 61, DIG. 1, DIG. 3; 340/173 AM, 173 SP, 172.5

[56] References Cited

U.S. PATENT DOCUMENTS

| 3,290,491 | 12/1966 | Wahlberg | 235/151.33 X |
| 3,469,247 | 9/1969 | Boulter et al. | 340/173 SP X |
| 3,594,735 | 7/1971 | Furlong et al. | 340/173 |
| 3,635,297 | 1/1972 | Salava | 177/25 X |
| 3,691,538 | 9/1972 | Haney et al. | 340/173 SP |
| 3,692,988 | 9/1972 | Dlugos et al. | 235/151.33 |
| 3,890,492 | 6/1975 | Manduley et al. | 235/151.33 |
| 3,967,271 | 6/1976 | Day | 235/151.33 X |
| 3,973,109 | 8/1976 | Foster | 235/151.33 |

Primary Examiner—Edward J. Wise
Attorney, Agent, or Firm—Pasquale A. Razzano

[57] ABSTRACT

An electronic postage scale for providing an indication of the requisite postage for a parcel in accordance with the weight, class of shipment and destination zone of the parcel includes a weight data generator for generating a digital representation of the weight of the parcel upon which postage is determined. A memory has a plurality of individual storge sections corresponding to the classes of shipment. Each storage section includes a two-dimensional array of storage locations, each storage location storing postage data representations corresponding to the postage required for the particular weight of the parcel and the destination zone. Each storage location is accessible by a first dimension address that is defined by the parcel destination zone and by a second dimension address which is defined by the parcel weight. A storage section is individually addressed in accordance with a selected class of shipment. Switches are provided for the manual selection of the class of shipment and the destination zone. The stored postage data at an addressed storage location is read out and is displayed.

Calibration and drive means are provided to automatically calibrate the weight data generator and to enable the proper generation of a digitized parcel weight to thereby minimize errors in determining the postage.

25 Claims, 4 Drawing Figures

ELECTRONIC POSTAGE SCALE

BACKGROUND OF THE INVENTION

This invention relates to an electronic postage scale and, in particular, to an improved postage scale wherein postage data is automatically determined and displayed in response to the weight of a parcel and in accordance with a selected class of shipment and destination zone forthat parcel.

Generally, in computing the requisite postage for a parcel to be mailed to a desired destination, such postage is not only dependent on the weight of the parcel but, in addition, depends upon the particular destination zone and the class of shipment that is desired. Typically, four distinct classes of shipment are avialable, each being associated with a unique postage rate. The four well-known classes of shipment are priority, parcel post, book rate and UPS.

Prior to the advent of automatic postage calculating devices, an individual would determine the proper postage by first weighing the parcel to be shipped and, once the weight of that parcel had been determined, a reference table associated with the selected class of shipment was consulted and the indicated postage for the desired destination zone was recorded. A comparison of postage rates for each class of shipment required that the individual refer to each reference table and record the corresponding postage obtained therefrom. It was fully appreciated that this technique of computing postage was not only time consuming but was subject to various errors that inadvertently could occur during the nrmal usage of such reference tables.

Accordingly, the introduction of automatic postage scales and calculating devices evidently met a definite need. One such prior art automatic postage scale is disclosed in my U.S. Pat. No. 3,738,438, assigned to Better Packages, Inc., the assignee of the present invention. This postage scale uses digital techniques to automatically provide an indication of the postage required for a selected class of shipment to a desired distance zone in accordance with the weight of the parcel to be shipped. The postage data for each class of shipment and destination zone are provided as coded perforations in an adjustable postage code roll. That is, the postage codes are arranged on the roll in a plurality of groups, each group representing the postage rates for a particular combination of distance zone and class of shipment. An operator advances the roll to select the proper rate group. When the proper rate group is selected, it consists of a plurality of sets of further codes representing the postage for various parcel weights in the selected rate group. The particular data set is detected in acccordance with the weight of the parcel and the postage represented by that data set is read out and displayed.

Although this prior art postage scale functions satisfactorily and has been favorably accepted, various features thereof can be readily improved. For example, the use of an encoded postage data roll requires that an operator, or auxilliary automatic apparatus, advance the roll until the proper rate group representing a predetermined class of shipment and a desired destination zone is obtained. This, of course, requires careful supervision by the operator and further requires the use of a bulky data roll that occupies space which could otherwise be advantageously used. Hence, the total time required to determine the requisite postage for a parcel, although significantly reduced from that theretofore required, can be still further reduced. Also, this scale does not fully exploit the total automation capabilities of automatic postage scales.

In another prior art postage scale employing digital techniques, an electronic memory is provided along with a complex data processing section. Postage data that is stored in the memory is read out therefrom in accordance with a complex address signal generated by the data processing section as a function of a parcel weight, class of shipment and destination zip code. The use of a data processing section adds to the cost of construction of such postage scale and adds complexities that, unfortunately, can provide a source of erroneous operaton. Furthermore, postage scales of this type are subject to false postage determinations in the event of improper calibration.

OBJECTS OF THE INVENTION

Therefore, it is an object of the present invention to provide an improved postage scale for providing an indication of the requisite postage for a parcel in accordance with the weight, class of shipment and destination zone of the parcel.

It is a further object of this invention to provide an improved postage scale admitting of relatively simple and low cost construction.

A further object of this invention is to provide an improved postage scale including a memory device for storing postage data for various weights, classes of shipment and destination zones and admitting of a novel memory addressing technique.

Another object of this invention is to provide an improved weighing device having novel automatic calibration apparatus.

A still further object of this invention is to provide an improved postage scale wherein weight data is easily and precisely generated.

Various other objects and advantages of the present invention will become clear from the ensuing description, and the novel features will be particularly pointed out in the appended claims.

SUMMARY OF THE INVENTION

A postage scale for providing an indication of the requisite postage for a parcel in accordance with the weight, class of shipment and destination zone of that parcel is disclosed, including a weight data generator for generating a digital representation of the weight of the parcel upon which postage is determined; a memory having a plurality of individual storage sections corresponding to the classes of shipment, each storage section including a two-dimensional array of storage locations whereat postage data representations corresponding to destination zones and parcel weights are stored, the individual storage sections being accessed in accordance with a manually operable switch for selecting a class of shipment, and an individual storage location being accessed by a first dimension address associated with the manual operation of a switch for selecting a destination zone and a second dimension address being defined by the parcel weight; the accessed storage location being read out and the stored data therein being displayed. The weight data generator includes a data-bearing element bearing coded indicia of parcel weight and adapted to be displaced with respect to a reference position in response to the weight of a parcel; data pick-up apparatus for sensing such coded indicia; and a driving device for providing relative motion between the data-bearing element and the data pick-up apparatus during a parcel weighing operation until a predetermined indicium or indicia is sensed by the data pick-up so that the digital representation of the parcel weight, as sensed by the data pick-up, is generated when such predetermined indicium or indicia is sensed. Calibration control is provided for automatically maintaining a predetermined initial position in the relation between the data bearing element and the data pick-up when the postage scale admits of its quiescent state.

BRIEF DESCRIPTION OF THE DRAWINGS

The following detailed description will best be understood in conjunction with the accompanying drawings in which.

DETAILED DESCRIPTION OF A CERTAIN PREFERRED EMBODIMENT

Figure 1:
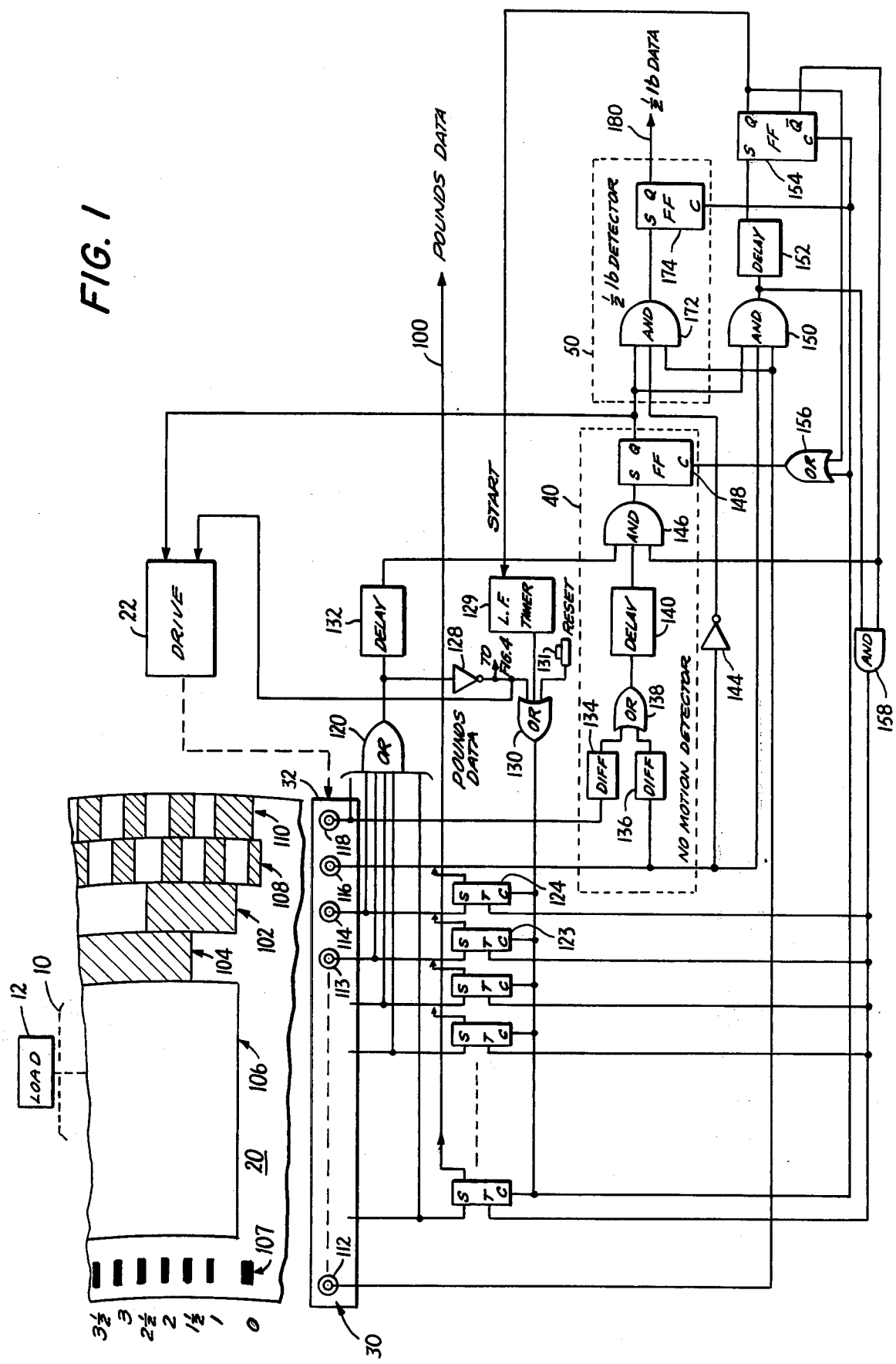
FIG. 1 is a logic diagram depicting the data generating portion of the present invention.

Referring now to the drawings, wherein like reference numerals are used throughout, and in particular to FIG. 1, there is illustrated a logic diagram of the weight data generating portion of the postage scale, in accordance with the present invention. As schematically depicted, the postage scale is comprised of a weighing platform 10 upon which a parcel 12 is adapted to be loaded so that the weight of such parcel can be determined and the requisite postage can be obtained. Although not shown herein, it should be understood that the weighing platform 10 is mechanically coupled to various load balancing devices via conventional linkage. For example, in one embodiment, conventional pendulum-type apparatus is mechanically linked to the weighing platform such that vertical movement of the platform is transmitted through the oinkage to the pendulum apparatus whereby a balance condition is attained. In an alternative embodiment, the weighing platform is mechanically linked to a balance beam of the type disclosed in aforementioned U.S. Pat No. 3,738,438 whereby vertical movement of the weighing platform is transmitted to the balance beam whereupon a balance condition is subsequently attained. In a still further embodiment, the weighing platform 10 is mechanically connected to conventional spring balance mechanisms. In any of these aforenoted embodiments, the movement of the weighing platform is transmitted to a data bearing element 20 that is mechanically connected to the platform. In one embodiment of the present invention which can be used with any of the aforenoted embodiments of the balance apparatus, the data bearing element 20 comprises a reticule having indicia thereon, to be described hereinbelow. Such reticule is displaced with respect to a reference position in accordance with the weight applied to the weighing platform 10. The reticule may be provided in a portion of a "fan-type" movement such as is conventionally found in weighing devices. In another embodiment, the reticule may be a rotatable disc having an angular displacement proportional to the weight applied to the weighing platform.

Only a portion of the reticule 20 is illustrated herein. As shown, the reticule bears coded indicia that is preferably arranged in a plurality of columns. For the embodiment wherein the reticule is a disc, the columns will appear as parallel, circular tracks, radially spaced across the disc. This coded indicia represents, in coded form, the weight of a parcel to be placed on the platform 10. For the purpose of the present discussion, it will be assumed that postage is determined upon the weight of an article in pounds. Accordingly, the term "pounds" as used herein is intended to describe the unit of weight upon which postage is calculated. Of course, any other units of weight can be used, such as grams, kilograms, and the like. Thus, the term "pounds" is to be construed as including such other units of weight.

The plurality of tracks, or columns, of indicia 102, 104, . . . 106 are thus coded representations of pounds. Although virtually any coded configuration can be used herewith, it is preferred to adopt the Gray code for depicting the weight of a parcel. Those of ordinary skill in the art of digital representations will recognize that the Gray code is less susceptible to erroneous encoding. Accordingly, if data pick-up devices are linearly arranged on an axis that is parallel to the radius of the disc, or that is transverse to the movement of the reticule 20, to thereby define a reference position, it is seen that, as the reticule is displaced, the linear array of pick-up devices is adapted to sense the varying coded representation of weight. For example, in the classes of shipment here under consideration, i.e., priority, parcel post, book and UPS, a maximum parcel weight of seventy pounds is accommodated. To accurately encode the weight of a parcel, up to seventy pounds, in integral poundage increments, it is appreciated that seven tracks, or columns, or indicia are provided. Accordingly, the data pick-up devices similarly comprise seven individual indicia sensing elements so as to produce a seven-bit representation of the parcel weight. That is, as the reticule 20 is displaced with respect to the reference position defined by the data pick-up devices, when a position of substantial equilibrium is attained, the indicia in proximity with the respective indicia sensing elements will cause the appropriate 7-bit weight representation to be generated. Of course, depending upon the expected usage of the postage scale, the maximum weight capacity thereof can be reduced, if desired. For example, if it is assumed that parcels weighing more that 63 pounds will probably not be shipped, the reticule 20 can be provided with only six tracks, or columns, of integral pound indicia resulting in the generation of a 6-bit digitized representation of parcel weight. Conversely, if the various classes of shipment contemplate a maximum parcel weight that exceeds one hundred twenty-seven pounds, an additional track, or column, of indicia may be provided and an 8-bit or greater digitization of parcel weight will be generated.

Since some of the classes of shipment require different postage for half-pound increments of parcel weight, an additonal track, or column, of indicia 108 is provided to depict such halfpound increments. More particularly, indicia of one type corresponds to a half-pound increment of weight and indicia of another type represents an integral pound increment. A still further track, or column, of indicia 110 is provided for the purposes of detecting when a position of substantial equilibrium has been attained.

In a preferred embodiment of the present invention, the indicia provided on the reticule 20 is an optically coded representation of weight. That is, such indicia are selectively light transmissive. Accordingly, indicia of one type are capable of transmitting light of a maximum intensity whereas indicia of another type are capable of transmitting light of minimum intensity, i.e., are not light transmissive. Hence, such indicia may, for example, comprise light and dark elements arranged in the aforenoted coded form. Such light and dark elements are, in one embodiment, adapted to selectively transmit light therethrough and, in another embodiment, are adapted to selectively reflect light therefrom. In the light transmission embodiment, the reticule 20 is interposed between a source of light and compatible data pick-up devices, such as photo-responsive devices. In the light reflection embodiment, the reticule 20 is disposed in a light reflecting path between a source or sources of light and such photo-responsive devices. Typically, the photo-responsive devices 30 are provided on a mechanical support 32 and are aligned in a linear array to define the aforenoted reference position and may comprise phototransistors, photodiodes photoresistors or other photo-electric elements, well-known to those of ordinary skill in the art. Accordingly, for the purpose of the present discussion, it may be assumed that, when light of relatively high intensity is received by such photo-responsive device, a relatively low output voltage is generated thereby. Such low output voltage is here designated in binary "0". Similarly, when light of relatively low intensity is received by such a photo-responsive device, a relatively high voltage is generated thereby. Such high voltage corresponds to a binary 1. It is, of course, recognized that the inverse of the aforedescribed relationship can be used such that when the photo-responsive device receives light of a low intensity a binary 0 is produced thereby. Also, the binary signals can be represented by other 2-level voltages admitting of positive and negative polarity, or other 2-level voltage configurations. Accordingly, when a light element in a track, or column, on the reticule 20 is in juxtapositon with an associated photo-responsive device, that device is here assumed to generate a binary 0 represented by a low voltage. Conversely, when a dark element is juxtaposed opposite an associated photo-responsive device, a binary 1 represented by a high voltage is produced.

As illustrated in FIG. 1, the weight increments marked at the inner radius, or left-most edge, are represented by the coded indicia aligned with such marks. Hence, the indicia aligned with the 1 pound mark is a coded representation of 1 pound. This coded representation is also present in alignment with the 1-½ pounds mark and, in addition, the half-pound increment track, or column, 108 is provided with a light element in alignment with the 1-½ pound mark. It is seen that the half-pound track is provided with light elements in alignment with each half-pound mark, as designated at the inner radius of the reticule, and is provided with dark elements at each integral pound mark. It should be further noted that, since those classes of shipment that distinquish between half-pound increments of weight and integral pound increments are limited to a predetermined number of such half-pound distinctions, for example, 1-½, 2-½, 3-½ and 4-½, the track 108 need not be coextensive with the remaining integral pound tracks 102, 104, . . . 106.

A further track 107 of indicia is provided in substantially precise alignment with the poundage designations provided at the left-most porton of the reticule. Such further indicia are adapted to be sensed by a corresponding photosensitive device 112 when the reticule 20 has been displaced such that a row of coded indicia is in correct alignment with the reference position defined by the data pick-up devices. Accordingly, the track 107 preferably is comprised of relatively sharp light-to-dark transitions, each followed by a small band of dark elements. The additional track of indicia 110 is comprised of alternating light and dark elements, as illustrated, which are adapted to be sensed by a corresponding photosensitive device 118. The light and dark elements of the respective tracks 108 and 110 are interspersed such that, if the reticule 20 is moving, it is expected that at least one of the associated photosensitive devices 116 and 118, respectively, will sense a transition of a light element to a dark element. The manner in which such sensed transitions are used to determine when the reticule 20 has reached a position of substantial equilibrium is described hereinbelow. It may be appreciated that, if desired, the tracks 107 and 110 may be combined in a single track. Alternatively, conventional transition sensing devices can be employed so as to eliminate the track 107 and its associated photo-responsive device 112 while the function of such track can be performed by the track 110 and its associated photo-responsive device 118 in cooperation with such transition sensing devices.

In an alternative embodiment, the coded indicia provided on the reticule 20 comprise magnetic elements. In this alternative embodiment, the aforenoted optically dark elements are replaced by such magnetic elements. Additionally, the data pick-up devices 30 are comprised of magnetic sensing elements, well-known to those of ordinary skill in the art. In a still further embodiment, the coded indicia and data pick-up devices are of the electrostatic type. In all of these embodiments, it is preferred to provide individual tracks, or columns, of indicia, each track, or column, being associated with a pick-up element.

In the preferred embodiment, the photo-responsive devices that are aligned with the integral pound tracks, such as photo-responsive devices 114, 113, . . . are respectively connected to a temporary storage circuit illustratively comprised of corresponding flip-flop circuits 124, 123, . . . These flip-flop circuits are of the type having a set input, a trigger input, a clear input and first and second outputs. If a binary 1 is applied to the set input and a binary 1 is applied, in coincidence, to the trigger input, the flip-flop circuit is "set" to produce a binary "1" at its first output and a binary 0 at its second output. Additionally, if a binary 1 is applied to the clear input, the flip-flop circuit is "cleared" such that a binary 0 now appears at the first output and a binary 1 appears at the second output. Such flip-flop circuits are conventional and further desription thereof need not be provided.

The integral pound increment photo-responsive devices 114, 113, . . . are connected to the set inputs of corresponding flip-flop circuits, and are additionally connected to an OR gate 120, together with the photo-responsive device 118. It is appreciated that an OR gate is adapted to produce a binary 1 at its output in response to a binary 1 supplied to one or more of its inputs.

The output of the OR gate 120 is connected to an OR gate 130 by an inverting circuit 128. An inverting circuit is a conventional logic circuit that is adapted to invert a binary signal applied thereto so as to produce a binary signal of opposite type. Thus, the inverting circuit 128 is adapted to produce a binary 0 when supplied with binary 1 and, conversely, to produce a binary 1 when supplied with a binary 0. The OR gate 120 is additionally connected to a delay circuit 132, the latter being connected to a no-motion detector circuit 40. The delay circuit 132 is adapted to respond to a binary 1 supplied thereto to produce a binary 1 at its output after a predetermined time interval. Moreover, such produced binary 1 admits of a predetermined duration. The delay interval exhibited by the delay circuit 132 is the so-called time-out interval.

As further illustrated, a low frequency timing circuit 129 is connected to another input of the OR gate 130. The timing circuit 129 is a low frequency oscillator adapted to generate a low frequency pulse train having a relatively narrow pulse duration. Such oscillator is conventional and, for example, may comprise an astable multivibrator. The purpose of the low frequency timing circuit is to reinitiate a data reading operation so as to insure an accurate digitization of the weight of the parcel loaded upon platform 10. As will be described in greater detail hereinbelow, the operation of the timing circuit 129 serves to recycle the postage determining operation of the postage scale. In addition, a manual reset switch 131 is connected to the OR gate 130 to permit an operator to manually initiate a recycling of the postage determining operation.

The no-motion detecting circuit 40, which is connected to the delay circuit 132 as well as to the photo-responsive devices 116 and 118, is comprised of differentiating circuits 134, 136, delay circuit 140, AND gate 146 and flip-flop circuit 148. Interconnected with the no-motion detecting circuit are AND gate 150, delay circuit 152 and flip-flop circuit 154. The differentiating circuits 134 and 136 are connected to the photo-responsive devices 118 and 116, respectively. The differentiating circuits are substantially identical and each is adapted to respond to a transitional signal supplied thereto by the photo-responsive device to generate an output pulse. In one embodiment, a positive output pulse is produced by the differentiating circuit if the signal supplied thereto undergoes a positive or negative transition. A relatively low voltage, equivalent to a binary 0 is produced by the differentiating circuit if the signal supplied thereto undergoes no transition. The differentiating circuits 134 and 136 are connected to the delay circuit 140 via OR gate 138. The delay circuit 140 is similar to the aforedescribed delay circuit 132. In addition, if, during the "time-out" interval of the delay circuit 140, another pulse is applied thereto, the time-out cycle is reintiated. Hence, the delay circuit 140 will produce a binary 1 as an output signal in response to a positive pulse applied thereto only if another succeeding positive pulse is not received during the "time-out" interval.

The delay circuit 140 is connected to the set input of the flip-flop circuit 148 by the AND gate 146. Those of ordinary skill in the art will recognize that an AND gate is adapted to produce a binary 1 as an output signal when each input terminal of the AND gate is supplied with a binary 1 in coincidence. Hence, the AND gate 146 is a coincidence circuit. In addition to being connected to the delay circuit 140, another input of the AND gate 146 is connected to the aforedescribed delay circuits 132 and a further input of the AND gate is connected to one of the output terminals of the flip-flop circuit 154.

The flip-flop circuit 148 is similar to the aforedescribed flip-flop circuits 124, 123, . . . in that it is adapted to be disposed in its "set" state when a binary 1 is supplied to the set input terminal thereof and is adapted to be disposed in its "cleared" state when a binary 1 is supplied to the clear input thereof. The flip-flop circuit 148, however, does not include a trigger input. As is recognized, when in its set state, a binary 1 is provided at a first output, designated the Q output, and a binary 0 is provided at the second output, not shown. Conversely, when in its cleared state, the flip-flop circuit produces a binary 0 at the Q output. As illustrated, the Q output of the flip-flop circuit 148 is connected to a drive circuit 22 and, additionally, to each of AND gates 150 and 172.

Figures 3, 4:
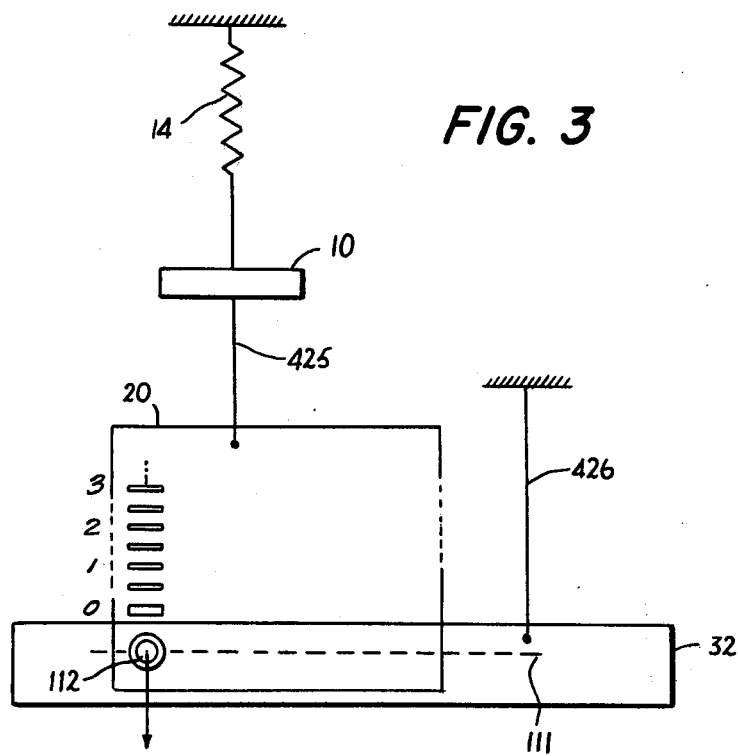
FIG. 3 is a schematic representation of a portion of the data generating apparatus of the present invention.
FIG. 4 is a schematic diagram of the calibration and drive control circuit that is used in the present invention.

The drive circuit 22 is described in detail hereinbelow with respect to FIGS. 3 and 4. It may here be noted that the drive circuit is adapted to advance the mechanical support 32 for the photo-responsive devices 30 after a position of substantial equilibrium has been attained by the reticule 20 in response to a weight loaded upon the platform 10 so that a line of coded indicia is positioned in correct optical alignment with the illustrated photo-responsive devices. As will become apparent, the drive circuit 22 is adapted to advance the photoresponsive devices through a relatively small displacement, which may be an angular displacement having an axis coaxial with the reticule disc. In addition, the drive circuit includes calibrating apparatus for maintaining a relative zero position between the reticule and the reference position, defined by the photo-responsive devices, when the platform 10 is not loaded with a parcel to be weighed.

The AND gate 150 is substantially similar to the aforedescribed AND gate 146 and, in addition to being connected to the flip-flop circuit 148 is connected to the half-pound increment photo-responsive device 116 and to the photo-responsive device 112. It will soon be seen that the AND gate 150 is adapted to detect when the reference position defined by the photo-responsive devices has been adjusted by the drive circuit 22 so that a line of coded indicia on the reticule 20 is properly aligned thereat. The output of the AND gate 150 is connected to the flip-flop circuit 154 through the delay circuit 152 and, additionally, is connected to the AND gate 158. The delay circuit 152 is substantially similar to the aforedescribed delay circuit 140 and, therefore, further description thereof need not be provided. Also, the flip-flop circuit 154 is substantially similar to the aforedescribed flip-flop circuit 148. As here illustrated, the flip-flop circuit 154 is provided with a second output terminal $\bar{Q}$ which is seen to be connected to an input of the AND gate 158 and to the aforedescribed AND gate 146. The Q output of this flip-flop circuit is connected to the clear input of the flip-flop circuit 148 through the OR gate 156. Another input of the OR gate 156 is connected to the output of the aforedescribed OR gate 130. As shown, the output of the OR gate 130 is additionally connected in common to the clear inputs of the flip-flop circuits 154 and 174.

The AND gate 158 is connected, at its output, to the trigger inputs of each of the flip-flop circuits 124, 123, . . . It will be appreciated that these flip-flop circuits comprise a temporary storage device for the binary signals generated by the integral pound increment photo-responsive devices when energized by the AND gate 158. This AND gate is adapted to be energized when the data pick-up devices 30 have been advanced by the driving circuit 22 so that a line of coded indicia is positioned at the reference position to be properly sensed by the data pick-up devices, such that an accurate digitized representation of the weight of the parcel is temporarily stored.

As noted above, some of the classes of shipment distinguish between a parcel weight of an integral number of pounds and a parcel weight having a half-pound increment. It is thus desirable to detect such half-pound increments. Accordingly, the half-pound detecting circuit 50 is provided and is comprised of the AND gate 172 and the flip-flop circuit 174. One input of the AND gate has been previously described as being connected to the Q output of the flip-flop circuit 148. Another input of this AND gate is connected through an inverting circuit 144 to the half-pound increment photo-responsive device 116. A still further input of this AND gate is connected to the photo-responsive device 112 in common with the AND gate 150. The output of the AND gate 172 is connected to the set input terminal of the flip-flop circuit 174. Thus flip-flop circuit is substantially similar to the aforedescribed flip-flop circuit 148 and, as noted above, the clear input thereof is connected in common with the clear input of the flip-flop circuit 154 to the OR gate 130. As will be described, when the flip-flop circuit 174 is disposed in its set state, a binary 1 is produced at the Q output and is supplied to the conductor 180. This binary 1 represents that the postage for the parcel then being weighed should be determined on the basis of a half-pound increment. This half-pound data is supplied to the memory illustrated in FIG. 2 as will be described below.

The operation of the weight data generating apparatus illustrated in FIG. 1 will now be described. Let it initially be assumed that no parcel is placed upon the platform 10. Accordingly, the support 32 for the data pick-up devices 30 will be controlled by the drive circuit 22 so as to be calibrated to properly establish a relative zero position between the reticule 20 and the data pick-up devices, as described below. When in the unloaded state, the line of coded indicia immediately below the 0 pound mark will be aligned with and sensed by each of the photo-responsive devices. In particular, each photo-responsive device (except the device 116) will be in juxtaposition to a light element so as to produce a binary 0. Accordingly, each input of the OR gate 120 is supplied with a binary 0 to thereby produce a binary 0 at its output. This signal produced by the OR gate has no effect upon the delay circuit 132 but is inverted to a binary 1 by the inverting circuit 128 and is then supplied by the OR gate 130 to each of the flip-flop circuits illstrated in FIG. 1. Hence, each of these flip-flop circuits is normally disposed in its cleared state so that a binary 0 is produced at each Q output and a binary 1 is produced at each $\overline{Q}$ output.

Let it now be assumed that a parcel 12 is placed upon the weighing platform 10. Because of the mechanical linkage between the weighting platform and the reticule 20, the reticule is displaced with respect to the reference position by an amount proportional to the weight of the parcel.

It is recalled that the coded indicia representing the integral pound increments are encoded in Gray code. It is a freature of the Gray code that a binary 1 is always present in at least one bit position. Thus, when the reticule 20 is displaced in response to the parcel placed upon the platform 10, at least one of the integral pound photo-responsive devices 114, 113, . . . and photo-responsive device 118 will supply a binary 1 to the OR gate 120. The OR gate thus supplies a binary 1 to the delay circuit 132 which, after the conclusion of the "time-out" interval, supplies a binary 1 to the AND gate 146.

It is appreciated that, as the reticule is displaced, the alternating light and dark elements in columns 108 and 110 are respectively scanned by the photo-responsive devices 116 and 118. When a transition from a light element to a dark element is detected by the photo-responsive device 116, a positive transition in the signal supplied to the differentiating circuit 136 is present. Accordingly, the differentiating circuit 136 produces a positive pulse which is supplied to the delay circuit 140 by the OR gate 138. Consequently, a time-out interval initiated by thedelay circuit, at the conclusion of which a binary 1 is expected. Similarly, when a light to dark transition is sensed by the photo-responsive device 118, the differentiating circuit 134 supplies a positive pulse to the delay circuit 140 through the OR gate 138 to thus reinitiate the time-out interval of the delay circuit. This reinitiation of the time-out interval will occur as long as the reticule 20 is moved such that either the photo-responsive device 116 or the photo-responsive device 118 senses a transition. As may be appreciated, each differentiating circuit may be of the type that responds to a light to dark transition only, or to a dark to light transition only, or to both types of transitions.

As long as the reticule 20 is being displaced in response to the weight of the parcel placed upon the weighing platform 10, the delay circuit 140 will repetitively be supplied with pulses so as to prevent the completion of the time-out interval thereof. Consequently, the delay circuit 140 will supply a binary 0 to the AND gate 146 while the reticule 20 is in motion. However, when the weight of the parcel is balanced, the reticule 20 reaches a position of substantial equilibrium. At that time, it is appreciated that the photo-responsive devices 116 and 118 will no longer detect light to dark (or dark to light) transitions. Hence, further pulses will no longer be supplied to the delay circuit 140 and the time-out interval of the delay circuit will expire. When the delay circuit has thus timed out, a binary 1 is supplied thereby to the AND gate 146. At this time, the AND gate 146 is supplied with a binary 1 at each of its inputs to thereby apply a binary 1 to the set input of the flip-flop circuit 148.

When the OR gate 120 produces a binary 1, the inverting circuit 128 inverts this binary 1 to a binary 0 which is supplied, by the OR gate 130, to the clear inputs of each of the illustrated flip-flop circuits 125, 124, . . . , 148, 154 and 174. Accordingly, the binary 1 supplied to the set input of the flip-flop circuit 148 by the AND gate 146 now activates this flip-flop circuit to its set state whereupon a binary 1 is supplied from the Q output of the flip-flop circuit to the drive circuit 22, to the AND gate 150 and to the AND gate 172. Thus, when the flip-flop circuit 148 admits of its set state, an indication is provided that the reticule 20 has reached a position of substantial equilibrium, i.e., "no motion."

It is normally expected that the parcel which is loaded upon the platform 10 does not precisely weight an integral number of pounds. Hence, when the reticule has reached a position of substantial equilibrium, there is a high probability that none of the dark elements included in the track 107 is in precise optical alignment with the photo-responsive device 112. That is, it is expected that a line of coded indicia coinciding the one of the illustrated weight designations is not accurately aligned at the reference position. Thus, and as will be described below with respect to FIG. 4, when the flip-flop circuit 148 is disposed in its set state, the drive circuit 22 is energized to now displace the support 32 for the photo-responsive devices 30 so as to adjust the reference position until a line of coded indicia is optically aligned with the photo-responsive devices. When such optical alignment is attained, it is appreciated that a dark element in track 107 is detected by the photo-responsive device 112 which thus supplies a binary 1 to the common connected inputs of the AND gates 150 and 172. If, when the photo-responsive device 112 generates a binary 1, a half-pound designation is sensed, it is recognized that the photo-responsive device 116 will be juxtaposed opposite a light element. Consequently, a binary 0 will be supplied to the AND gate 150 by the photo-responsive device 116. The AND gate will not be actuated and the drive circuit 22 will continue to displace the support 32.

In an alternative embodiment, the drive circuit is coupled to the reticule 20, rather than the support 32, so as to adjust the position of the reticule. This has the same effect as adjusting the position of the photo-responsive devices 30. In either embodiment, the relative position of a line of coded indicia and the reference position is adjusted.

When the photo-responsive device 112 generates a binary 1 in response to detecting an integral pound designation, it is seen that a dark element is sensed by the photo-responsive device 116. Accordingly, each of the remaining inputs of the AND gate 150 is now supplied with a binary 1 so that the AND gate is actuated to produce a binary 1 at its output. This binary 1 produced by the AND gate 150 is supplied to one input of the AND gate 158, the other input of which is supplied with a binary 1 from the $\bar{Q}$ output of the flip-flop circuit 154, this circuit having been previously disposed in its cleared state, as aforedescribed. Therefore, the AND gate 158 supplies each of the flip-flop circuits 124, 123, . . . comprising the temporary storage device with a binary 1 at its trigger input. The binary signals produced by the photo-responsive devices aligned with the tracks 102, 104, . . . 106 are now selectively applied to the set inputs of these flip-flop circuits so as to dispose selective ones of these circuits in their set states. Consequently, the digitized representation of the weight of the parcel 12 is now stored in the flip-flop circuits 124, 123, . . . The outputs of these flip-flop circuits are applied to a data bus 100 to thus supply the digital representation of the parcel weight to the memory apparatus illustrated in FIG. 2.

In addition to enabling the temporary storage circuit to now store the digitized coded representation of weight, the binary 1 produced by the AND gate 150 initiates a time-out interval of the delay circuit 152. At the conclusion of this interval, which is selected to be sufficient to enable the temporary storage circuit to adequately store the binary signals supplied thereto by the photo-responsive devices, the delay circuit supplies a binary 1 to the set input of the flip-flop circuit 154 to now dispose this flip-flop circuit in its set state. Accordingly, a binary 1 is now provided at the Q output of the flip-flop circuit, this binary 1 being supplied through the OR gate 156 to the clear input of the flip-flop circuit 148. When the flip-flop circuit 154 is thus actuated to its set state, the resulting binary 0 supplied to the AND gate 158 by the $\bar{Q}$ output of the flip-flop circuit now terminates the binary 1 that had been supplied to the trigger inputs of the respective flip-flop circuits comprising the temporary storage circuit. Thus, the digital representation of the parcel weight is now firmly stored in these flip-flop circuits until a binary 1 is subsequently supplied to the clear inputs thereof.

The binary 1 supplied to the clear input of the flip-flop circuit 148 by the OR gate 156 actuates this flip-flop circuit to its cleared state, thereby producing a binary 0 at its Q output. Consequently, the drive circuit 22 is de-energized and the relative displacement between the reference position defined by the photo-responsive devices 30 and the reticule 20 is terminated. Also, when the flip-flop circuit 148 is disposed in its cleared state, the AND gate 150 is de-energized and no longer responds to the signals that might be supplied thereto by the photo-responsive devices 112 and 116.

The manner in which the half-pound detecting circuit 50 is activated will now be described with reference to a specific numerical example. Let it be assumed that the parcel 12 weighs 2-¼ pounds. Accordingly, when the flip-flop circuit 148 is actuated to its set state, a line of indicia between the 2 pound and 2-½ pound designations will be aligned with the reference position. As described above, the drive circuit 22 will now be energized to further displace the photo-responsive devices 30. When the 2-½ pound mark is aligned at the reference position, it is seen that the photo-responsive device 116 detects a light element in the track 108. Hence, a binary 0 is supplied to and inverted by the inverting circuit 144 to thus apply a binary 1 to an input of the AND gate 172. At this time, the binary 1 provided at the Q output of the flip-flop circuit 148 is also applied to the AND gate 172; however, until the 2-½ pound mark in the track 107 is sensed by the photo-responsive device 112, the AND gate 172 is not actuated. Now, then the reticule 20 is properly aligned such that the 2-½ pound designation in the track 107 is sensed by the photo-responsive device 112, the AND gate 172 is actuated to supply a binary 1 to the set input of the flip-flop circuit 174. This flip-flop circuit will thus be disposed in its set state to supply a binary 1 to the conductor 180 from its Q output. This data is utilized, in a manner to be described, by the memory, where applicable, to represent that the weight of the parcel upon which postage is to be determined includes a half-pound increment. This, of course, is appropriate since a parcel weighing 2-¼ pounds which is to be shipped by, for example, priority mail, must be provided with postage that is determined on the basis of 2-½ pounds.

Now, when the 2-½ pound mark is reached such that the photo-responsive device 112 supplies a binary 1 to the AND gate 150, as well as the AND gate 172, it is appreciated that the photo-responsive device 116 supplies a binary 0 to the former AND gate. Thus, the AND gate 150 is not actuated and the drive circuit 22 continues to advance the photo-responsive devices 30. Once the photo-responsive device 112 then detects the 3 pound mark, the photo-responsive device 116 will likewise detect a dark element such that the AND gate 150 is now supplied with a binary 1 at each of its inputs. Consequently, the AND gate 158 is actuated to enable the temporary storage flip-flop circuits to now store the digital representation of the parcel weight and the flip-flop circuit 154 is disposed in its set state. The digital representation of the 3 pounds that is stored in the temporary storage circuit, together with the half-pound signal supplied to the conductor 180, is used by the memory to now determined the appropriate postage. For example, and as will soon be described, if the parcel is to be shipped by priority mail, the 3 pound digitized data is used in conjunction with the half-pound signal so that the priority postage is based upon a parcel weighing more than 2 pounds but less than 2-½ pounds. As another example, if the parcel is to be shipped by parcel post, the half-pound signal produced by the flip-flop circuit 174 is ignored and the 3 pound digitized data is used to determine the postage on the basis that the parcel weighs more than 2 pounds but less than 3 pounds. Since the parcel post postage rates make no allowance for parcels weighing an increment of a half-pound, such postage determination is, of course, proper.

It is recognized that if the actual weight of the parcel 12 is 2¾ pounds, the AND gate 172 will not be energized while the relative position of the reticule with respect to the reference position is adjusted by the drive circuit 22 to a position wherein the 3 pound designation is sensed by the photo-responsive device 112. This is because a dark element is sensed by the photo-responsive device 116 in the interval 2½ to 3 pounds, which causes a binary 0 to be supplied to the AND gate 172. Accordingly, in this example, the temporary storage flip-flop circuits will store a digitized representation of 3 pounds, as before, but the flip-flop circuit 174 will remain in its "cleared" state. Consequently, no half-pound data will be supplied to the conductor 180.

It is possible that, in some instances, the data stored in the temporary storage flip-flop circuits is not an actual representation of the parcel weight. This can arise, for example by an operator jolting the weighing platform at the time the temporary storage flip-flop circuits are enabled to store the binary signals generated by the photo-responsive device. Also, external stimuli might cause vibrations of the platform which could be reflected in erroneous data stored in the temporary storage flip-flop circuits. Also, extraneous matter might be loaded on the platform along with the parcel to be weighed, or portions of the platform load might be removed during the weighing operation. To avoid a deleterious postage indication in response to such disturbances, the timing circuit 129, which is activated by the flip-flop circuit 154, periodically supplies a binary 1 to each of the illustrated flip-flop circuits to thus reinitiate the temporary storage operation at the oscillating rate of the timing circuit 129. Hence, the data stored in the temporary storage flip-fflop circuits are periodically updated to accurately reflect the proper parcel weight. Alternatively, or in addition, such a reinitiation can be attained by the operator if the reset switch 131 is actuated.

Once the postage has been determined and displayed, as described below, the parcel 12 may be removed from the platform 10. The scale balance mechanism returns the platform to its quiescent position and the reticule 20 is likewise returned to its initial, or relative zero, position. Consequently, each of the photo-responsive devices 112, . . . , 113, 114 and 118 senses a light element to thereby produce a binary 0. Hence, the OR gate 120 is now supplied with a binary 0 at each of its inputs so as to supply a binary 0 to the inverting circuit 128. This binary 0 is inverted and supplied through the OR gate 130 to each of the illustrated flip-flop circuits as a binary 1. Accordingly, the illustrated apparatus is returned to its quiescent condition, as previously described, and is now prepared to perform another weighing operation.

Figure 2:
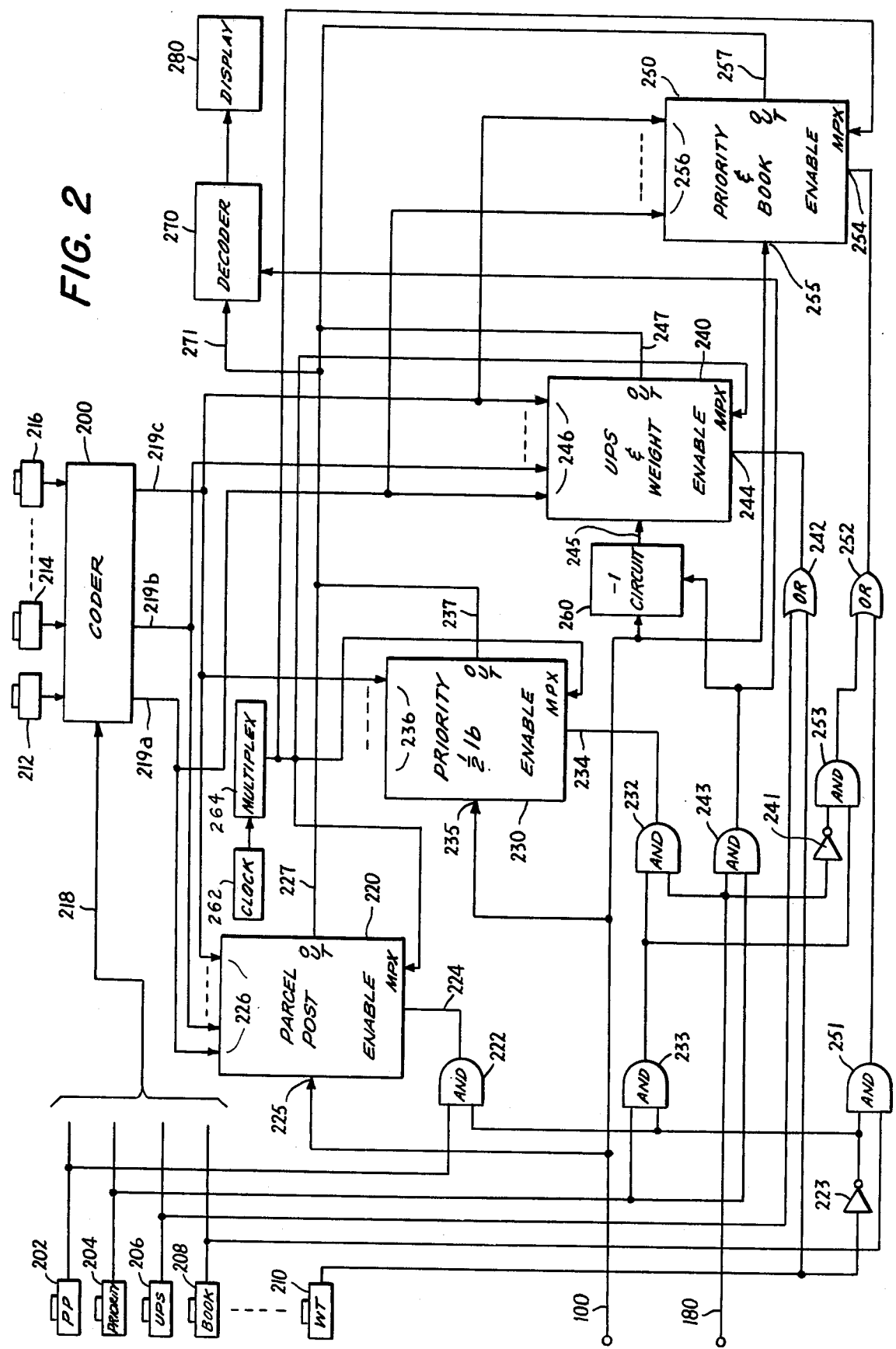
FIG. 2 is a logic diagram and partial block diagram of the memory portion of the present invention.

Referring now to FIG. 2, there is illustrated a memory device for storing postage data for each increment of parcel weight and for each class of shipment and destination zone. The memory is preferably comprised of a plurality of individual sections, each section being associated with a particular class of shipment. For example, a memory section 220 is provided to store the postage for all weights and destination zones of a parcel to be shipped by parcel post. Similarly, a memory section 240 is provided to store the postage data for all weights of a parcel to be shipped to various destination zones by United Parcel Service (UPS). Also, a memory section 250 is provided to store the postage data for all rates of parcels to be shipped to various destination zones by priority mail. To simplify the circuitry and to thus minimize the cost of construction of the postage scale, the priority mail memory section includes a further section 230 that is associated with parcel weights including half-pound increments. The memory is also adapted to store the postage required for various weights of parcels, such as books, that are to be shipped in accordance with book rates. Since the book rate of postage is not a function of the destination zones, a minimal amount of postage data need be stored therefor. Although a separate storage section can, of course, be provided to store the book rate postage, such data can advantageously be stored in one of the aforedescribed memory sections whose capacity is not fully used. For the purpose of this discussion, such book rate postage data is stored in the priority memory section 250. However, such data can be stored in any other available memory section, as aforenoted.

Although not necessary for the satisfactory operation of the present invention, data representing the parcel weight upon which postage is determined is stored in one of the storage sections. For example, if a parcel weighs 2-¾ pounds and is shipped by any of the aforementioned classes of shipment, it is desirable, in some instances, to apprise the operator that postage for that parcel has been determined on the basis of a greater than 2 pounds but less than 3 pounds postage rate. As another example, if the actual weight of a parcel is 2-¼ pounds and is to be shipped by priority mail, it might be desirable to apprise the operator that the postage for that parcel had been determined on the basis of a greater than 2 pounds but less than 2-½ pounds postage rate. This weight data can, of course, be stored in any of the aforenoted stoage sections having an available capacity and, for the purpose of the present discussion, is here stored in the storage section 240.

Each of the storage sections is comprised of a read only memory (ROM) of the type that is commercially available. Such read only memory devices are comprised of semiconductor integrated circuit chips, and each storage section is preferably provided on an individual, replaceable circuit board such that, in the event of postage rate changes, the corresponding stored postage data can easily be revised. Each read only memory is comprises of a plurality of postage data storage locations disposed in a two-dimensional array of columns and intersecting rows. A storage location can be accessed by addressing a selected column and a particular row. Once assessed, the postage data stored at this location is adapted to be read out therefrom. As will soon be described, the addressable columns of each storage section are connected in common to a column address generator and the addressable rows of the storage sections are connected in common to receive a row address. Additionally, output terminals of the respective storage sections from which the postage data stored at the addressed storage locaton is read out are connected in common to read-out apparatus. Furthermore, each storage section is of the type having an enable input which must be provided with an enable signal, such as binary 1, to permit the addressed storage section therein to be accessed. In one embodiment of the present invention, such an enable input is connected to gating devices which must be actuated to permit a column address and a row address to access a corresponding storage location. In another embodiment, the enable input is connected to output gating devices which must be actuated to permit the data stored at an accessed storage location to be read out from the storage location. In either embodiment, it is seen that the various columns of each of these storage sections are connected to a coding circuit 200 which is adapted to generate a selected column address. As will soon become apparent, this address is a function of the destination zone for the parcel and class of shipment and, therefore, is herein referred to as a destination address.

As is appreciated, the postage data stored in each storage location in the storage sections represents dollars and cents. The dollars portion consists of a two digit decimal number and, similarly, the cents portion consists of a two digit decimal number. Accordingly, in one embodiment employing conventional digital codes to represent these decimal numbers, the full, four-digit representation of postage data can be represented by a sixteen-bit digital (or binary) word. Although suitable memory devices capable of storing sixteen-bit words are known, these memory devices generally are expensive. Therefore, it is more economical to store the postage data in two separate eight-bit words (dollars and cents) or in four separate four-bit words (tens nd units of dollars, and tens and units of cents). Preferably, each storage location in a storage section is formed of two parts for storing two eight bit words, or of four parts for storing four four-bit words. Thus, once a particular storage location is addressed, multiplex, or time-sharing, techniques are used to read out each part of the storage location. To this effect, each storage section additionally is provided with a multiplex input, all of the multiplex inputs being connected in common to a multiplexer 264. The multiplexer is conventional and is adapted to produce individual control output signals sequentially in response to clock pulses applied thereto by a clock generator 262. These output signals are periodic to thus define a multiplex cycle. During each multiplex cycle, the individual parts of an addressed storage location are sequentially read out under the control of the multiplex control output signals.

Generally, the destination zones to which a parcel can be shipped are divided into a local zone and eight enumerated zones. Of course, a separate postage rate is required for each zone and for each parcel weight. However, as is known, not every class of shipment distinguishes between precisely the same zones. For example, for parcel post, the local zone together with zones 3–8 require individual postage rates, depending upon the parcel weight. But zones 1 and 2 require the identical postage rates, depending upon parcel weight. As another example, priority mail groups the local zone and zones 1, 2 and 3 together for common postage rates, and prescribes individual postage rates for zones 4–8, depending upon parcel weight. Representative portions of the postage rate tables for such parcel post and priority classes of shipment are set forth below in Tables I and II.

Table 1 - Parcel Post

| Weight 1 pound and not exceeding (pounds) | Zones | | | | | | | |
|---|---|---|---|---|---|---|---|---|
| | Local | 1 & 2 | 3 | 4 | 5 | 6 | 7 | 8 |
| 2 | $0.61 | $0.72 | $0.75 | $ .83 | $0.92 | $1.02 | $1.12 | $1.21 |
| 3 | .65 | .78 | .83 | .92 | 1.04 | 1.18 | 1.32 | 1.45 |
| 4 | .69 | .84 | .90 | 1.01 | 1.16 | 1.33 | 1.51 | 1.69 |
| 5 | .73 | .90 | .98 | 1.10 | 1.28 | 1.49 | 1.71 | 1.93 |
| 6 | .77 | .96 | 1.05 | 1.19 | 1.40 | 1.64 | 1.90 | 2.17 |

Table II - Priority

| Weight not exceeding (pounds) | Zones | | | | | |
|---|---|---|---|---|---|---|
| | Local, 1, 2 & 3 | 4 | 5 | 6 | 7 | 8 |
| 1 | $1.25 | $1.25 | $1.30 | $1.30 | $1.30 | $1.30 |
| 1,5 | 1.50 | 1.54 | 1.60 | 1.68 | 1.75 | 1.82 |
| 2 | 1.75 | 1.83 | 1.95 | 2.06 | 2.20 | 2.34 |
| 2,5 | 1.93 | 2.03 | 2.17 | 2.31 | 2.48 | 2.65 |
| 3 | 2.11 | 2.23 | 2.39 | 2.56 | 2.76 | 2.96 |
| 3,5 | 2.29 | 2.43 | 2.61 | 2.81 | 3.04 | 3.27 |
| 4 | 2.47 | 2.63 | 2.83 | 3.06 | 3.32 | 3.58 |
| 4,5 | 2.65 | 2.83 | 3.05 | 3.31 | 3.60 | 3.89 |
| 5 | 2.83 | 3.03 | 3.27 | 3.56 | 3.88 | 4.20 |
| 6 | 3.19 | 3.43 | 3.71 | 4.06 | 4.44 | 4.82 |

The storage sections 220 and 250, which are provided to store postage data, are preferably configured in the aforenoted two-dimensional array that substantially correspond to the above tables. For convenience, the half-pound postage data associated with priority mail is stored in appropriate configuration in storage section 230. Although not reproduced herein, it should be recognized that the remaining storage section 240 likewise stores postage data in two-dimensional array corresponding to its respective postage rate table. Preferably, a column of a storage section is associated with a destination zone used by that class of shipment. Since each class does not use the identical destination zones, it is appreciated that the destination address applied to each storage section must take this into account so that a proper column is addressed depending not only upon the selected destination zone but also upon the selected class of shipment.

The coding circuit 200 is adapted to take the foregoing into account so as to generate the appropriate destination address to be supplied to the various storage sections in accordane with the selected destination zone and class of shipment. Accordingly, the coding circuit preferably comprises an array of gating circuits for providing such destination addresses in accordance with signals supplied thereto representing the selected destination zone and class of shipment. In an alternative embodiment, the coding circuit comprises a matrix array, such as a conventional diode matrix, for generating the appropriate destination address signals.

The destination address signals are, in one embodiment, a coded representation of a particular column to be addressed. For example, if the maximum number of columns included in a storage section is eight, then the coding circuit 200 will produce a 3-bit coded representation of one of the eight columns to be selected. In such an embodiment, the 3-bit code will be supplied to the inputs of each storage section which can be considered to correspond to column inputs. In an alternative embodiment, again assuming a maximum of eight columns, the coding circuit 200 includes eight outputs that are selectively connected to the various column inputs of each of the storage sections. Storage locations corresponding to a column are accessed when an output signal produced by the coding circuit corresponds to such storage locations. For those storage sections having a column of storage locations in which no data is stored, that column is not connected to the associated output of the coding circuit.

The signals supplied to the coding circuit and representing the class of shipment and destination zone of the parcel are adapted to be produced by a first set of manually operable class selecting switches and a second set of manually operable zone selecting switches, respectively. The class selecting switches include a switch 202 for selecting shipment by parcel post, a switch 204 for selecting shipment by priority mail, a switch 206 for selecting shipment by UPS and a switch 208 for selecting shipment in accordance with the book rate. In a preferred embodiment, the switches 202-208 comprise mechanically or electrically interlocked push-button switches of the type whereby one and only one switch can be activated at a given time. That is, if one of these push-button switches is pressed, any other push-button switch that might have been previously depressed is now deactuated. Such push-button switches and the mechanical or electrical interlocking action therebetween are conventional. For the purpose of the present discussion, the actuation of a push-button switch results in the generation of a signal, such as a binary 1 at an output of such switch. Furthermore, these switches may be provided with respective sources of illumination so as to apprise an operator of the particular switch which has been depressed and actuated. Of course, various alternative embodiments of switching devices may be used as the switches 202-208. The outputs of these switches are connected, as by the bus 218, to the coding circuit 200. Preferably, the bus 218 comprises individual conductors associated with respective ones of the switches. Alternatively, a coding circuit, not shown, may be connected to the switches so as to generate a coded representation, such as a 2-bit code, of the particular switch that has been actuated. This coded representation could then be supplied in either parallel or serial format to the coding circuit 200.

The zone selecting switches are comprised of a plurality of individually operate switching devices 212, 214, . . . , 216. In a preferred embodiment, these devices comprise mechanically or electrically interlocked push-button switches of the type previously described with respect to the switches 202-208. Hence, the depression of a particular zone selecting switch will actuate that switch while deactuating, or releasing, any other previously depressed switch. Since it is conventional to provide at least a local destination zone together with eight enumerated destination zones, a total of nine zone selecting switches associated with each of these zons, may be provided. Each of the zone selecting switches is here shown as being connected directly to the coding circuit 200. In an alternative embodiment, a further coding circuit is interposed between the zone selecting switches and the circuit 200 so as to provide a coded representation, such as a 4-bit code, of the particular zone switch that has been depressed.

It is recognized that shipment by book rate does not distinguish between destination zones. That is, the postage rate for a given parcel weight is the same regardless of the particular destination zone for the parcel. Accordingly, the selection of book rate, as by activating the switch 208, need not be accompanied by the activation of a zone selecting switch to energize the coding circuit 200. In fact, there is the possibility that ambiguity in producing the destination address may result if a zone selecting switch is activated when the book rate switch 208 is activated. Hence, the book rate switch 208 is interlocked (not shown) to release or deactivate a zone selecting switch that might have been activated; and to prevent the activation of a zone selecting switch.

An additional push-button switch 210 is provided to permit an operator to be apprised of the parcel weight upon which the postage is determined. This weight switch 210 is preferably a push-button switch similar to the push-button switches 202-208, described above. However, this switch is not interlocked with the aforenoted class selecting switches. Nevertheless, as will be shown, actuation of this switch results in the generation of a signal that effectively disables the electrical operation ascribed to a previously depressed class switch.

In addition to being connected to the coding circuit 200, the class switches are also connected to various gating devices to selectively enable an appropriate one of the storage sections to be addressed such that postage data stored therein can be read out. For example, the parcel post switch 202 is connected to the enable input 224 of the parcel post storage section 220 by AND gate 222. The purpose of this AND gate is to prevent the parcel post storage section from being accessed when the weight push-button 210 is depressed. That is, when an operator wishes to be apprised of the parcel weight upon which postage has been determined, such weight information is derived from the storage section 240 in accordance with this illustrative embodiment. Accordingly, it is preferred to access the storage section 240 to obtain the appropriate weight data therefrom, and the remaining storage sections should, at that time, be disabled. Thus, the AND gate 222 includes another input that is connected to the weight push-button switch 210, via an inverting circuit 223. As will be seen, the actuation of the weight switch 210 results in deactuation of the AND gate 222, thereby disabling the parcel post storage section 220 from being accessed by a destination address and digitized weight data.

Although the postage for each weight increment of a parcel to be shipped by priority mail can, of course, be stored in a single storage section, it will be appreciated that it is convenient to provide individual storage sections 230 and 250 for such postage data. In particular, the priority storage section 230 is adapted to store only the postage data associated with half-pound increments of weight. For example, if a parcel weighs more than an integral number of pounds but less than a half-pound increment, it is recognized that the postage for such parcel is determined on the basis of such half-pound increment. Thus, the appropriate postage data is stored in the storage section 230 and will be read out therefrom. However, if a parcel weighs more than a half-pound increment of weight but is less than an integral number of pounds, the postage therefor is determined on the basis of an integral number of pounds. In this case, the postage data is stored in the priority storage section 250 and is read out therefrom. It will, of course, be recognized that such half-pound postage data for priority mail is provided for parcels of only 1½, 2½, 3½ and 4½ pounds. Consequently, the appropriate postage data will be obtained from the priority storage section 230 only for those instances wherein the parcel weighs between 1 and 1½ pounds, 2 and 2½ pounds, 3 and 3½ pounds and 4 and 4½ pounds. It is apparent that this postage data can, of course, be stored in the priority storage section 250, if desired. However, the convenience of storing such half-pound increment postage data in a separate storage section will soon become apparent.

Depression of the priority push-button switch 204 is thus seen to enable either the priority storage section 230 or the priority storage section 250, depending upon whether the parcel weight is such that postage is to be determined upon a half-pound increment. Accordingly, the priority push-button switch 204 is connected through an AND gate 233 to either the enable input 234 of the storage section 230 via an AND gate 232, or to the enable input 254 of the storage section 250 via an AND gate 253. The AND gate 233 is provided for the same purpose as the aforenoted AND gate 222 and thus includes another input connected to the weight push-button switch 210 via the inverting circuit 223. The AND gates 232 and 253 are adapted to be selectively actuated in accordance with the presence of half-pound data as produced by the aforenoted flip-flop circuit 174. Accordingly, the AND gate 232 includes another input connected to the half-pound data bus 180. Similarly, the AND gate 253 includes another input connected to the half-pound data bus 180 via an inverting circuit 241.

It is recalled that the storage section 240 stores data representing the weight of a parcel upon which postage is determined as well as UPS postage data. Accordingly, this storage section is expected to be accessible in response to the depression of either the UPS push-button switch 206 or the weight push-button switch 210. Hence, the enable input 244 of the storage section 240 is connected to both of these push-button switches via an OR gate 242. The weight data can be provided in a separately addressable column.

It is also recalled that, since the postage for a parcel to be shipped by book rate does not distinguish among destination zones, the book rate postage data admits of a minimal amount and, therefore, may be stored in a column particularly reserved therefor in the storage section 250. Hence, the storage section 250 is adapted to the accessed in response either to the depression of the priority push-button switch 204 or the book rate push-button switch 208. As is appreciated, the book rate push-button switch 208 is connected via an AND gate 251 to an OR gate 252. This OR gate also receives the output of the previously described AND gate 253 and thus produces an output that is supplied to the enable input 254 of the storage section 250. It is appreciated that the AND gate 251 is adapted to perform the same function as the aforementioned AND gate 222 and thus includes another input connected to the weight push-button switch 210 via the inverting circuit 223.

The digitized weight data stored in the temporary storage flip-flop circuits, previously described with respect to FIG. 1, is supplied to the storage sections 220, 230, 240 and 250 via data bus 100. The data bus comprises a plurality of conductors equal in number to the flip-flop circuits comprising the temporary storage circuit so that the digitized weight data is supplied in parallel to each of the storage sections and may be considered to be a row address therefor. In an alternative embodiment, the digitized weight data is serialized and supplied to the storage sections via a single conductor. Accordingly, the bus 100 is connected to the data input 225 of the parcel post storage section 220, the data inputs 235 and 255 of the priority storage sections 230 and 250, and to the data input 245 of the UPS storage section 240. A data converting circuit 260 is interposed between the data bus 100 and the data input 245 of the storage section 245. This data converting circuit is adapted to be selectively actuated so as to permit either the weight data supplied to the data bus 100 to pass therethrough in an unmodified form or, when actuated, to modify this data and to supply such modified data to the data input 245. The converting circuit 260 includes an enable input coupled to the output of an AND gate 243, the latter having an input connected to the half-pound data bus 180 and another input connected to the priority push-button 204. The output of this AND gate is further connected to a half-pound data input of a decoding circuit 270, to be described. As will soon become apparent, the data converting circuit 260 is adapted to be operable to permit the proper weight data to be read out from the storage section 240 in the event that a parcel is to be shipped by priority mail and the weight of such parcel upon which postage is determined includes any half-pound increment. However, when the storage section 240 is accessed for postage data stored therein in response to the depressing of the UPS push-button switch 206, or in response to the depressing of any other class selecting switch, or when there is no half-pound data on the half-pound data bus 180, then the data converting circuit 260 is not operated.

When operated, the data converting circuit 260 is adapted to respond to data supplied thereto by the weight data bus 100 to subtract a one pound increment from that weight data. It is recalled that the data generating apparatus illustrated in FIG. 1 will supply digitized data to the data bus 100 representing a parcel weight of, for example, 2 pounds if the actual weight of the parcel is greater than 1 but less than 2 pounds. Hence, such 2 pound data will be applied to the data bus 100 even if the parcel weight is less than 1½ pounds. However, when operated, the data converting circuit 260 effectively subtracts 1 pound from this 2 pound data to supply the data input 245 of the storage section 240 with 1 pound data. If the actual weight of a parcel is, for example, less than 2½ pounds but greater than 2 pounds, the data bus 100 will be supplied with data representing 3 pounds. If now operated, the data converting circuit 260 converts such 3 pound data to 2 pound data. This data conversion operation is similarly performed by the data converting circuit whenever such circuit is actuated. Accordingly, it is apparent that the data converting circuit may comprise a conventional subtracting circuit well known to those of ordinary skill in the art. As an alternative, since only selective data representations are to be converted, the data converting circuit comprises a gating netwok so as to, for example, convert 2 pound data to 1 pound data, convert 3 pound data to 2 pound data, convert 4 pound data to 3 pound data and convert 5 pound data to 4 pound data. These selective parcel weights are recognized as being the selective half-pound incremental weights for which specific postage rates are required by priority mail.

The read out terminals 227, 237, 247 and 257 of the storage sections 220, 230, 240 and 250 are connected via a readout bus 271 to the decoding circuit 270. The decoding circuit 270 is, in turn, coupled to a display unit 280 and is adapted to decode the stored data representation transmitted thereto by one of the storage sections into a form which is compatible with display unit 280. Accordingly, the decoding circuit is conventional, for example, comprising a gating array and input and output storage devices. The decoding circuit may also include conventional circuits for changing the data format supplied to the decoding circuit such that the signals applied to the display unit and compatible with and capable of energizing that unit. Accordingly, if the display unit is designed to receive serial data signals, the decoding circuit includes a parallel-to-serial converter. Alternatively, if the display unit is responsive to analog control signals, the decoding circuit includes conventional digital-to-analog converting circuitry.

The display unit 280 is adapted to provide a visual display to apprise an operator of the proper postage determined for the weighed parcel and to selectively indicate the weight upon which such postage has been determined. Accordingly, the display unit 280 may comprise, for example, a conventional 7-segment display device, a numeric light display device or other conventional apparatus well known to those of ordinary skill in the art. Hence, when the appropriate signals are supplied to the display unit 280 by the decoding circuit 270, a corresponding numeric indication is displayed and an operator can observe the data that has been read out from an appropriate storage section.

The manner in which the apparatus illustrated in FIG. 2 operates upon the data supplied to the data bus 100 and the half-pound data bus 180 will now be described. Let it be assumed that, prior to loading a parcel upon weighing platform 10, a suitable class of shipment and destination zone are selected. This, of course, is attained by manually operating a selected one of the push-button switches 202–208 and a selected one of push-button switches 212–216. Accordingly, appropriate signals are supplied to the coding circuit 200 by the depressed push-button switches, respectively. The coding circuit responds to the signals supplied thereto to generate a destination address at its outputs 219a, 219b, ... 219c. It is recognized that such destination address may comprise a coded representation or, alternatively, a binary 1, for example, may be supplied to an appropriate one output terminal. The destination address thus generated is supplied to the storage section 220, 230, 240 and 250 to thereby define a particular column to be addressed. It is recognized that this addressed column is thus a function of the selected class of shipment and the selected destination zone.

In particular, let it be assumed that the parcel post switch 202 is actuated. Let it further be assumed that the zone selecting switch associated with, for example, zone 3 is also depressed. Consequently, the coding circuit 200 supplies a destination address that is capable of accessing the appropriate column in the parcel post storage section 220 at which postage rates for zone 3 are stored. As a further example, if such postage rates are stored in the third column of the storage section 220, the destination address generated by the coding circuit 200 represents that column 3 is to be accessed. This destination address is seen to be applied to each of the storage sections. In addition, when the parcel post switch 202 is actuated, a binary 1 is applied to the AND gate 222. Let it further be assumed that the weight switch 210 is not now depressed. Accordingly, a binary 0 is supplied by the weight switch and is inverted by the inverting circuit 223 such that the AND gate 222 is supplied with a binary 1 at each of its inputs. Accordingly, the AND gate supplies a binary 1 enable signal to the enable input 224 of the parcel post storage section 220. It is recognized that, upon the operation of the parcel post switch 202, any other switch that might previously have been activated is released so as to prevent the application of an enable signal to any of the other storage sections.

Now, after a parcel has been loaded upon the platform 10 and the digital data representing the weight of that parcel is stored in the temporary storage flip-flop circuits, such weight data is supplied by the data bus 100 to each of the storage sections 220, 230, 240 and 250. Let it be assumed that such weight data represents a parcel weight of 5 pounds. Since only the parcel post storage section 220 is supplied with a destination address, weight data and an enable signal, it is appreciated that the postage data stored at the storage location defined by the column accessed by the destination address and the row accessed by the weight data of only the enabled parcel post storage section 220 is read out therefrom and is coupled from the data output 227 to the read-out bus 271 to the decoder 270. Hence, the postage data stored at the storage location defined by the accessed column and row, i.e., column 3 as determined by the destination address and the row corresponding to a parcel weight of 5 pounds, is read out and displayed to thereby apprise an operator that the weighed parcel requires a postage of 98 cents to be shipped to zone 3 via parcel post.

Since it has been assumed that the postage data is stored in individual parts of the addressed storage location, e.g., four parts, this data is read out in response to the multiplex control signals applied to the storage section 220 by the multiplexer 264. Thus, during the first portion of the multiplex cycle, the first part of the addressed location, which stores the tens digit for the dollars representation (which in this case is 0) is read out, the data is decoded, and then displayed. During the second portion of the multiplex cycle, the second part of the addressed location, which stores the units digit for the dollars representation (which in this case is 0) is read out, the data is decoded, and then displayed. During the third portion of the multiplex cycle, the third part of the addressed location, which stores the tens digit for the cents representation (which in this case is 9) is read out, the data is decoded, and then displayed. And during the fourth portion of the multiplex cycle, the fourth part of the addressed location, which stores the units digit for the cents representation (which in this case is 8) is read out, the data is decoded, and then displayed. Hence, if the display 280 is a conventional 4-digit display, and if the multiplexing frequency is sufficiently high, the full postage information will be displayed without perceptible flickering.

Now, let it be assumed that an operator wishes to note the appropriate parcel weight upon which the postage has been determined. This readily attained by actuating the weight switch 210. It is recalled that the weight switch is not interlocked with the class switches 202–208 and, therefore, the depression of the weight switch does not release the parcel post switch 202. However, when the weight switch is actuated, a binary 1 is supplied to an inverted by the inverting circuit 223 to thereby disable the AND gate 222. Consequently, the enable signal that had previously been applied to the enable input 224 of the storage section 220 is now terminated. Thus, the data stored at the accessed storage location in the parcel post storage section is no longer read out therefrom. Instead, an enable signal is now supplied to the enable input 244 of the storage section 240 by the OR gate 242 which has received a binary 1 from the weight switch. In addition, although not shown herein, it should be noted that a gating network is provided such that when the weight switch is depressed the destination address which had been previously supplied to the storage section 240 by the coding circuit 200 to access a selected column is now effectively disabled and the predetermined column wherein weight data is stored is now accessed. It is appreciated that the data converting circuit 260 is not enabled at this time (for example, the priority switch 204 does not supply a binary 1 to the AND gate 243) so that the weight data supplied to the data bus 100 passes unmodified through the circuit 260 to access the appropriate row in the enabled storage section 240. Therefore, the weight data stored in the weight storage column at the row associated with the 5 pound data supplied to the data input 245 is read out in multiplex format from the storage section and is decoded by the decoding circuit 270 such that the display unit 280 now displays a visual indication of 5 pounds. Thus, the operator is now apprised that the postage of 98 cents has been determined on the basis of the parcel not weighing more than 5 pounds.

It should be appreciated that, when the weight switch 210 is released, the still depressed parcel post switch 202 again enables the parcel post storage section 220 to read out the data representing a postage of 98 cents to the decoding circuit 270 so that the display unit 280 once again displays such postage. It should also be appreciated that, as the low frequency timing circuit 129 of FIG. 1 operates to continually revise or up-date the data stored in the temporary storage flip-flop circuits, or if this data is revised following an operator's actuation of the reset switch 131, such revised data is supplied by the data bus 100 to the parcel post storage section 220. Accordingly, if the initially determined weight data changes, a corresponding change in the accessed storage location is attained and the corresponding revised postage data is read out to the decoding circuit 270 and is displayed by the display unit 280.

Let it now be assumed that it is desired to ship a parcel by priority mail to, for example, zone 1. In the now appreciated manner, the priority switch 204 is depressed and the switch associated with zone 1 is also depressed. The depression of the priority switch 204 releases the previously depressed parcel post switch 202. Similarly, the previously depressed zone switch is released when the switch associated with zone 1 is now depressed. Accordingly, the coding circuit 200 produces a destination address corresponding to the depressed class and zone switches. Since the postage for a parcel shipped by priority mail to any of the local zone or zones 1, 2 or 3 is the same, the destination address here represents that column in which such postage is stored. Thus, that column in the priority storage sections 230, 250 in which the postage for zone 1 is stored is accessed.

Since the weight switch 210 is, at this time, assumed to be released, the binary 0 supplied thereby is inverted and supplied to the AND gate 233 as a binary 1. Consequently, the AND gate 233 is activated to supply a binary 1 to each of the AND gates 232 and 253. It is recalled that these latter AND gates are selectively responsive to the presence of half-pound data on the half-pound data bus 180 so as to selectively enable either the priority storage section 230 or the priority storage section 250. Let it now be assumed that a parcel is loaded upon the weighing platform 10 having an actual weight of $3\frac{3}{4}$ pounds. In accordance with the aforedescribed operation of the weight data generating apparatus of FIG. 1, the data supplied to the data bus 100 corresponds to a weight of 4 pounds. In addition, the half-pound data bus 180 is not supplied with a half-pound data signal. Accordingly, a binary 0 is supplied to the half-pound data bus 180 to thereby disable the AND gate 232. However, this binary 0 is inverted by the inverting circuit 241 and is supplied as an enabling binary 1 to the AND gate 253. Consequently, a binary 1 is supplied through the OR gate 252 to the enable input 254 of the priority storage section 250. It is recognized that only this storage section is now enabled. Accordingly, postage data stored at the storage location defined by the accessed column and the row corresponding to such 4 pound data is read out from the storage section 250 and is supplied to the decoding circuit 270 by the read-out bus 271. Hence, the display unit 280 provides a visual display of such read out postage data. As is observed from Table II above, the display unit 280 indicates that a postage of $2.47 is required for the parcel loaded upon the weighing platform 10.

Now, if an operator wishes to ascertain the parcel weight upon which such postage has been determined, the weight switch 210 is depressed. As is recalled, the actuation of the weight switch results in a binary 0 supplied by the inverting circuit 223 to now disable the AND gate 233. Hence, a binary 0 is supplied to the AND gate 253 and the enable signal previously applied to the enable input 254 of the storage section 250 is terminated. At this time, the storage section 240 is enabled by the binary 1 supplied thereto through the OR gate 242 from the weight switch 210. In addition, as noted above, the actuation of the weight switch supplies a predetermined destination address to the storage section 240 to thereby access the predetermined column wherein the weight data is stored. Thus, the 4 pound data supplied to the data bus 100 passes through the converting circuit 260 (which had not been enabled) to the data input 245. The now enabled storage section 240, being accessed at a selected column and a selected row, supplies the stored weight data from the accessed storage location therein to the decoding circuit 270. Thus, as before, the operator now obtains a visual indication of the parcel weight upon which the postage has been determined. In this instance, the display unit 280 displays a visual indication that the postage has been determined upon a weight not exceeding 4 pounds.

Upon releasing the weight switch 210, the previously accessed storage section 250 is again enabled to supply the appropriate postage data from the accessed storage location therein to the decoding circuit 270 and the display unit 280 once again provides a visual indication of the determined postage.

Let it now be assumed that the parcel which is to be shipped to zone 1 via priority mail admits of an actual weight of 3¼ pounds. In the manner described above with respect to the weight data generating apparatus of FIG. 1, a half-pound indication is stored in the flip-flop circuit 174 and data representing a weight of 4 pounds is stored in the temporary storage flip-flop circuits. Accordingly, half-pound data is supplied to the half-pound data bus 180 together with the 4 pound data supplied to the data bus 100.

In accordance with the half-pound data supplied to the bus 180, a binary 1 is supplied to the AND gate 232. Also, this binary 1 is inverted by the inverting circuit 241 such that a binary 0 is now supplied to the AND gate 253. Hence, the storage section 250 is now disabled and an enabling signal is supplied from the AND gate 232 to the enable input 234 of the storage section 230. It should be appreciated that although the storage section 230 is provided for parcels weighing an increment of a half pound, the postage data are stored at locations determined by the integral pounds data provided at the data bus 100. That is, the postage data required for a parcel weighing not more than 1½ pounds is stored at a row to be accessed by 2 pound data. Similarly, the postage data required for parcels weighing less than 2½ pounds is stored at a row to be accessed by 3 pound data. Also, the postage associated with parcels weighing less than 3½ pounds and less than 4½ pounds are stored at rows to be accessed by 4 pound and 5 pound data, respectively. Thus it is seen that the 4 pound data provided on the data bus 100 now accesses a row in the storage section 230 at which the postage necessary for a 3½ pound parcel is stored. The storage location at which the proper postage is stored is now seen to be determined by this accessed row and the accessed column that is defined by the destination address. The postage data stored in this accessed storage location is read out and supplied by the read-out bus 271 to the decoding circuit 270. Accordingly, the display unit 280 now displays a postage of $2.29 which is necessary to ship the weighed parcel to zone 1 by priority mail.

As described above, the parcel weight upon which this postage has been determined can now be indicated by actuating the weight switch 210. In the now recognized manner, operation of the weight switch 210 results in a binary 0 supplied to the previously energized AND gate 233. Consequently, this AND gate together with the AND gate 232 are now deactuated to terminate the enable signal previously applied to the enable input 234 of the storage section 230. As this storage section is now disabled, the postage data stored therein at the accessed storage location is not read out and is thus not displayed at the display unit 280. However, by depressing the weight switch 210, a binary 1 is supplied through the OR gate 242 to the enable input 244 of the storage section 240. Also, as described above, by depressing the weight switch 210, a predetermined column is accessed in the storage section 240. Hence, this storage section is now in condition to read out the data, i.e., weight data, that is stored in the predetermined column at a row determined by the parcel weight data supplied thereto.

It is recalled that the weight push-button switch 210 is not interlocked with the class selecting switches 202–208. Hence, the previous actuation of the priority switch 204 is not disturbed by depressing the weight switch 210. Accordingly, a binary 1 is supplied from the priority switch 204 to the AND gate 243. At this time, the presence of half-pound data on the half-pound data bus 180 supplies another binary 1 to the AND gate 243. This AND gate is thus activated to supply a binary 1 to the half-pound data input 248 of the storage section 240 and, additionally, to now enable the data converting circuit 260. As the data converting circuit is now enabled, it effectively operates to subtract one pound from the weight data supplied thereto by the data bus 100. Thus, the 4 pound data supplied to the data bus by the temporary storage flip-flop circuits is converted to 3 pound data. This 3 pound data is supplied to the data input 245 which accesses the appropriate row in the storage section to now read out from the addressed storage location weight data representing 3 pounds. This stored data is read out from the output 247 over the read-out bus 271 to the decoding circuit 270 whereat it is combined with the half-pound data signal derived from the AND gate 243. Hence, the display unit 280 now indicates that the previously displayed postage had been determined upon a parcel weighing less than 3½ pounds. This indication is, of course, proper since it has previously been assumed that the parcel loaded upon the weighing platform 10 admits of an actual weight of 3¼ pounds. In an alternative embodiment, a suitable row in the storage section 240 can be provided with weight data representing a parcel weight of 3½ pounds. In that embodiment, the output from the AND gate 243 can be combined with the output from the data converting circuit 260 to access that row, whereby weight data representing a parcel weight of 3½ pounds is read out from the storage section and supplied to the decoder 270.

Upon releasing the weight switch 210, the AND gate 233 is again activated to thus energize the AND gate 232 whereby an enable signal is again supplied to the enable input 234 of the storage section 230. Hence, the display unit 280 once again indicates that the weighed parcel requires a postage of $2.29 to be shipped to zone 1 by priority mail. Of course, the detected parcel weight is periodically updated, as by the operation of the aforedescribed low frequency timing circuit 129. If, during this periodic update of weight data, the data stored in the temporary storage flip-flop circuits is revised, a corresponding revision in the displayed postage will be attained.

Postage for a parcel to be shipped by the remaining classes of shipment is seen to be determined in substantially the same way as set forth hereinabove. Accordingly, if a parcel is to be shipped to a predetermined zone by UPS, the actuation of the UPS switch 206 will supply a binary 1 to the OR gate 242, whereby an enable signal will be supplied to the enable input 244 of the storage section 240. The combination of the depressed UPS switch and a predetermined zone switch will result in a destination address that defines a particular column in the storage section 240. The weight of the parcel, as detected by the weight generating apparatus illustrated in FIG. 1, is supplied over the data bus 100, through the converting circuit 260 to the data input 245 to thereby define a particular row in the storage section. The postage data stored at the thus defined storage location is read out and displayed by the display unit 280. It is appreciated that, since the priority switch 204 is not depressed at this time, the data converting circuit 260 is rendered inoperative and data supplied thereto by the data bus 100 merely passes through this circuit and is not modified thereby.

Similarly, when the book rate switch 208 is depressed, the AND gate 251 is energized to supply a binary 1 to the OR gate 252, whereby an enable signal is supplied to the enable input 254 of the storage section 250. It is recalled that activation of the book rate switch releases all zone selecting switches. Hence, by depressing the book rate switch 208, a corresponding destination address will be produced by the coding circuit 200 to access a particular column in the storage section 250. The postage data stored in this accessed column at a row defined by the weight data supplied to the weight data input 255 is thus read out and is displayed by the displaying unit 280.

The manner in which the mechanical support 32 for the photo-responsive devices 30 is driven by the drive circuit 22, and a preferred embodiment of this drive circuit will now be described. Referring now to FIG. 3, there is illustrated a schematic representation of the weighing platform 10 that is mechanically connected to the reticule 20. As noted above, the weighing platform is adapted to be displaced in response to a parcel being loaded thereon. Various balancing mechanisms have been described above and, in the interest of simplification, a spring balancing device 14 is schematically depicted. The weighing platform 10 is thus mechanically connected to such balancing mechanism and is additionally connected to the reticule 20 by a conventional mechanical linkage 425. As shown diagrammatically, an expandable wire 426, which is a high resistance wire having, preferably, a high coefficient of expansion, is mechanically connected to the support 32. In the interest of simplification, other supporting structures, linkage and the like for the mechanical support 32 are not shown. As the temperature of the expandable wire increases, the wire expands or "stretches" in its longitudinal dimension. The expansion of the wire 426 results in a corresponding displacement of the photo-responsive devices with respect to the reticule 20. This feature is exploited to provide a relative displacement between the reference position, designated 111, defined by the photo-responsive devices, and the reticule to thus facilitate data encoding. This displacement also is relied upon to accurately calibrate the postage scale. The drive circuit which is used to so displace the photo-responsive devices (and thus the reference position) and to calibrate the postage scale is schematically represented in FIG. 4.

The calibration and drive circuit is comprised of control transistors 408 and 414, amplifying transistor 424 and switches 418 and 428. The circuit additionally includes and AND gate 404 connected to the base electrode of the control transistor 408. The AND gate has a first input connected to the photo-responsive device 112 by an inverting circuit 402 and another input connected to the output of the inverting circuit 128 of FIG. 1. The control transistor 408 is adapted to be disposed in either its conducting or non-conducting state and includes a collector-emitter circuit that is connected across a source of energizing potential +V by a resistor 410. Since the transistor is herein illustrated as an NPN transistor, the emitter electrode is seen to be connected to ground. However, if the transistor comprises a PNP transistor, it is appreciated that the respective collector and emitter electrode connections may be reversed.

The collector electrode of the transistor 408 is connected by a resistor 412 to the base of a control transistor 414. This transistor is also adapted to be disposed in either its conducting or non-conducting state and includes a collector-emitter circuit that is connected across the potential source +V by a resistor 416 and by the switch 418. The switch 418 is adapted to be selectively opened or closed so as to selectively provide a current conducting path, in accordance with a control signal applied thereto. The switch 418 may comprise an electromechanical switch, such as a relay having an energizing coil connected to the inverting circuit 128 and having its controlled contacts connected in series with the emitter electrode 414, or a solid-state switch controlled by the inverting circuit 128 and connected in series with the collector-emitter circuit of the transistor 414. The output of this switch is connected to ground by the capacitor 420. A discharge resistor 422 for the capacitor is connected in parallel with the capacitor by the switch 418.

The junction defined by the switch 418 and the capacitor 420 is connected to the base electrode of the amplifying transistor 424 through a current limiting resistor 423. This transistor is biased to its conducting state and is adapted to control the current flowing therethrough to its emitter load. As shown, this transistor is connected in emitter-follower configuration having the expandible wire 426 as its emitter load. It is appreciated that, when the transistor 424 is rendered more conductive, higher current is permitted to flow through the expandible wire to thereby cause such wire to expand. When the conductivity of this transistor is reduced the expandible wire is permitted to cool. The purpose of maintaining a current flow through the expandible wire and to modulate this current flow is to prevent the wire from cooling completely. The temperature-time characteristic of the expandable wire is asymptotic; and the expansion factor thereof is approximately the same for a given temperature differential regardless of the actual temperature. For example, approximately the same amount of contraction occurs if the temperature of the wire changes from 500° to 400° or from 300° to 200°. But since the temperature-time characteristic is asymptotic, it takes significantly longer to cool the wire from 300° to 200° than to cool the wire from 500° to 400°. Therefore, to minimize this time delay and improve the response time of the drive circuit, it is preferred to maintain the wire at a relatively high temperature by providing a normal current flow therethrough. The wire will contract when the temperature is reduced by decreasing this current flow and, conversely, the wire will expand when the temperature is increased by increasing the current. This current flow through the expandible wire is determined by the conductivity of the transistor 424 which, in turn, is controlled by the voltage stored on the capacitor 420. For this reason, it is preferred to minimize undesired leakage from the capacitor by employing the current limiting resistor 423.

The switch 428 is connected in parallel with the transistor 424. This switch may be substantially similar to the aforedescribed switch 418 and, for the purpose of description, is shown here as a transistor switch. The switch 428 is adapted to be energized when the aforedescribed flip-flop circuit 148 is disposed in its "set" state. Accordingly, the base electrode of the transistor 428 is connected to the Q output of the flip-flop circuit. It is appreciated that if the switch 428 is formed as a relay switch, the energizing coil thereof is connected to the Q output of the filp-flop circuit.

The manner in which the circuit 22 operates to effectively calibrate the postage scale will now be described. When the weighing platform 10 is not loaded, the de-energized quiescent position assumed by the reticule 20 is such that the zero pound level is slightly above the reference position, i.e., the position of the photo-responsive devices, identified by the reference numeral 111 in FIG. 3. It is thus appreciated that the photoresponsive devices illustrated in FIG. 1 are juxtaposed opposite light elements. Consequently, a binary 0 is supplied to each input of the OR gate 120, resulting in a binary 0 supplied to the inverting circuit 128. As seen in FIG. 4, a binary 0 supplied to this inverting circuit results in a binary 1 applied to the switch 418 and to an input of the AND gate 404.

It is recalled that a binary 1 is assumed to be represented by a relatively positive potential. Accordingly, the binary 1 supplied to the switch 418 is sufficient to energize that switch so that a current conducting path is established therethrough.

As the reticule 20 is slightly above the reference position, it is appreciated that the photo-responsive device 112 does not here detect the dark band disposed at the zero pound demarcation. Consequently, the photo-responsive device 112 supplies a binary 0 to the inverting circuit 402 which, in turn, applies a binary 1 to the other input of the AND gate 404. The AND gate, now being actuated, supplies a binary 1 to the base electrode of the transistor 408 to thus actuate the transistor to its conducting state. Accordingly, a relatively negative base-emitter potential is provided at the transistor 414. This potential is sufficient to actuate the transistor 414 to its conductive state so that current is permitted to flow from the source +V, through the resistor 416, through the conducting transistor 414, through the energized switch 418 to the capacitor 420. This capacitor now charges to a positive potential.

The voltage provided at the charged capacitor is applied to the base electrode of the transistor 424 and is recognized as being sufficient to increase the conductivity of the transistor. Hence, more current flows from the source +V through the conducting transistors 424 and through the expandible wire 426. This wire heats up as more current flows therethrough so as to increase its temperature. As the temperature of the expandible wire increases, the wire itself expands and the photo-responsive devices are displaced to bring the reference position 111 and the zero pound demarcation into alignment.

When the photo-responsive device 112 detects the zero pound demarcation, a binary 1 is supplied thereby to the inverting circuit 402. The supplied binary 1 is inverted and supplied by the inverting circuit 402 to the AND gate 404 so as to deactuate the AND gate. The resulting binary 0 produced by the AND gate 404 is supplied to the base electrode of the transistor 408. This transistor is now rendered non-conductive to thereby reduce the potential across the base-emitter junction of the transistor 414 to a magnitude that is not sufficient to maintain the transistor 414 in its conducting state. As the transistor 414 is rendered non-conductive, the current charging path to the capacitor 420 is interrupted. Accordingly, the voltage stored by the capacitor is now permitted to discharge through the resistor 422 and the activated switch 418. As the voltage level on this capacitor is reduced the conductivity of the transistor 424 correspondingly is reduced. Hence, current flow through the expandible wire 426 decreases to cool the wire. As the wire cools, it contracts so as to displace the reference position 111 in an opposite direction. Thus, the zero pounds demarcation on the reticule 20 again is disposed above the reference position 111. At this time, the photo-responsive device 112 is juxtaposed opposite a light element so as to supply a binary 0 to the inverting circuit 402. Consequently, in the manner described above, the expandible wire 426 again is heated and the mechanical support 32 for the photo-responsive devices is again correspondingly driven. Thus it is seen that when the postage scale admits of its quiescent state wherein no parcel is loaded upon the platform 10, the reticule 20 is maintained substantially at its zero level and, more particularly, there is a relative oscillation of the reference position 111 about the zero level.

Let it now be assumed that a parcel is loaded upon the weighing platform 10. As has been described hereinabove with respect to FIG. 1, after the weighing platform has been displaced in response to the parcel loaded thereon and has attained a position of substantial equilibrium, the flip-flop circuit 148 is disposed in its set state. Also, since the weighing platform is moved from its zero level position, the binary 1 which now is produced by the OR gate 120 is inverted and supplied as a binary 0 to the switch 418 by the inverting circuit 128. Thus, the aforedescribed current supplying circuit including the switch 418 is deactuated when the weighing platform is loaded with a parcel, and the charge on the capacitor 420 remains stored thereon. However, the set state of the flip-flop circuit 148 provides a binary 1 at the Q output thereof, this binary 1 being sufficient to energize the switch 428. Current to the expandible wire 426 now increases through the energized switch 428 such that the wire is permitted to heat up and to expand. It is appreciated that, as the wire expands, a relative displacement between the reticule 20 and the photoresponsive devices 30 obtains until an integral pound demarcation is aligned with the photo-responsive device 112, and the coded data sensed by the photo-responsive devices 114, 113, . . . is entered into the temporary storage flip-flop circuits 124, 123, . . . in the aforedescribed manner. It is recalled that, after such coded data has been temporarily stored, the flip-flop circuit 148 is cleared to resume its clear state. Accordingly, after such parcel weight data representation has been generated, the binary 0 now supplied to the switch 428 by the Q output of the flip-flop circuit 148 selectively opens the switch to interrupt the current conducting path to the expandible wire 426, and the expandible wire is permitted to cool.

When the parcel is unloaded from the platform 10 the platform and reticule are returned to their quiescent position and the aforedescribed calibrating circuit is again operable to oscillate the reference position 111 in the vicinity of the reticule zero level position. The postage scale is thus prepared for a subsequent weighing operation which is carried out in the manner described in detail above.

While the postage scale of the present invention has been described with reference to a preferred embodiment thereof, it is readily apparent that various changes and modifications in form and details can be made. For example, the particular logic circuits described herein are merely exemplary and may be replaced by conventional NAND gate, NOR gates, and the like, well known to those of ordinary skill in the art. Also, whereas parallel transmission of data has been described, as between the temporary storage flip-flop circuits and the respective memory storage sections, it is recognized that such data may be serially transmitted. Thus, the digitized weight representation stored in the temporary storage flip-flop circuits can be serially read out therefrom and supplied to the memory.

It is, of course, appreciated that the postage data stored in the memory is associated with the particular classes of shipment desired. Although the classes of parcel post, priority mail, UPS and book rate have been assumed, it is recognized that other and additional classes of shipment can be included. Furthermore, the memory can be enlarged to encompass more than the illustrated classes of shipment or, conversely, reduced to eliminate selected ones of such classes of shipment. In the described embodiment of FIG. 2, the particular storage sections have been discussed with a view toward minimizing the requisite memory devices so as to correspondingly minimize the cost of construction of the postage scale and the cost of possible revision which might be necessary to incorporate postage revisions. Hence, depending upon the precise design and construction of the storage sections, various obvious alternatives can be used. For example, the individual priority storage sections can be combined into a single storage section. Also, if desired, the weight data stored in the aforedescribed storage section 240 can, alternatively, be stored in any of the other storage sections, as desired. As a further modification, the weight data provided on the data bus 100 can be supplied directly to the decoding circuit when the weight switch 210 is actuated, thus obviating the storage of weight data in the memory, for most instances. If further desired, individual storage sections can be provided for the weight data and/or the book rate postage data. Furthermore, although individual storage sections are preferred to thus minimize necessary revisions in the postage data as might be required, the present invention is, of course, operable even if only a single read only memory device is used. Also, the multiplexed read out of postage data can be eliminated, if desired, by using a memory capable of storing data words of suitable length, for example, 16-bit data words. However, the relatively uncomplicated multiplex circuitry more than offsets the higher cost of such a memory.

Depending upon the configuration of data as stored in the memory, the decoding circuit 270 may, if an appropriate stored data code is used, be omitted. Also, the display unit 280 may, in addition to displaying the data read out from the memory, include various conventional mechanisms to automatically record and apply the read out postage to the parcel being weighed. Moreover, since the read out postage data is arranged in a desirable digitized coded form, it is appreciated that such data can be used by conventional devices, such as a digital computer, or the like, to aid in automatic accounting procedures wherein a record of such postage is to be stored. Additionally, although the units of weight have here been described with reference to pounds and to half-pound increments, it is appreciated that other weight units can be employed. For example, the reticule 20 may represent grams, kilograms, ounces, tenths of pounds, or the like. In that event, the postage data stored in the memory would correspond to such weight units.

The drive mechanism can, alternatively, be mechanically coupled to the reticule. In this alternative configuration, relative displacement between the reference position defined by the photo-responsive devices and the zero level and pound increments of the reticule still is provided. This can be achieved, for example, by securing the photo-responsive devices to a fixed support and by coupling the reticule to the weighing platform by an expandible wire. Also, the drive control circuit illustrated in FIG. 4 is intended to be merely illustrative of one embodiment capable of carrying out this function. Other circuits, such as integrated circuit chips, differential amplifiers, and the like, can be used to control the heating current flowing through the expandible wire as a function of the relative position of the reference position with respect to the indicia on the reticule.

Therefore, it is intended that the appended claims be interpreted as including the foregoing and various other changes

What is claimed is:

1. A postage scale for providing an indication of the requisite postage for a parcel in accordance with the weight, class of shipment and destination zone of said parcel, comprising:

weight data generating means for generating a digital representation of the weight of said parcel upon which postage is determined;

memory means having a plurality of individual storage sections corresponding to said classes of shipment; each of said storage sections including a two-dimensional array of storage locations, a first dimension being defined by destination addresses and a second dimension being defined by weight increments and at which storage locations postage data representations corresponding to destination zones and parcel weight are stored;

first manually operable switch means for generating, when operated, a signal representing a selected class of shipment;

second manually operable switch means for generating, when operated, a signal representing a selected destination zone;

encoding means coupled to said first and second switch means and responsive to said generated signals for producing a coded signal representing a destination address;

means coupled to said first switch means for selecting one of said storage sections in accordance with the generated signal representing said selected class of shipment;

means coupled to said weight data generating means for supplying said digital representation of parcel weight to all of said storage sections; and read-out means coupled to all of said storage sections for reading out the one postage data representation stored in the storage section selected by said first switch means at the location defined by the coded signal produced by said encoding means and the digital representation of said parcel weight.

2. A postage scale in accordance with claim 1 wherein each of said storage sections is comprised of read only memory means having a plurality of columns, each associated with a destination address, and a plurality of rows, each associated with a weight representation, said read only memory means further including an enable input for receiving said generated signal representing said selected class of shipment, such that the postage data representation stored at the intersection of a column and row and selected by said coded signal produced by said encoding means and said digital representation generated by said weight data generating means is read out when said enable input is supplied with said generated signal representing said selected class of shipment.

3. A postage scale in accordance with claim 2 wherein a predetermined column of one of said storage sections is provided with data representing parcel weight at each storage location therein, such that the parcel weight data stored at a storage location selected by said digital representation generated by said weight data generating means is read out from said predetermined column whenever a predetermined one of said first switch means is operated.

4. A postage scale in accordance with claim 3 wherein said read-out means includes means for indicating half-pound data in addition to the parcel weight data read out from said predetermined column of said storage section when the actual weight of said parcel is greater than an integral number of pounds but less than a half-pound increment.

5. A postage scale in accordance with claim 1 wherein said weight data generating means comprises pounds data generating means for generating a digital representation of an integral number of pounds related to the actual weight of said parcel; and half-pound data generating means for generating a half-pound indication representing that the actual weight of said parcel is greater than an integral number of pounds but less than a half-pound increment.

6. A postage scale in accordance with claim 5 wherein at least one of said storage sections stores postage data representations corresponding to half-pound increments of parcel weight; and further including gating means responsive to the operation of a predetermined one of said first switch means and said half-pound indication for supplying a selecting signal to said one storage section, such that postage data stored in said one storage section is read out from a location therein defined by said coded signal produced by said encoding means and said digital representation generated by said pounds data generating means when said selecting signal is produced.

7. A postage scale in accordance with claim 1 wherein said weight data generating means comprises data bearing means bearing optically coded indicia of parcel weight, said last-mentioned means being displaceable with respect to a reference postion in response to the weight of said parcel; and optical reading means disposed at said reference position for generating a digital representation of said coded indicia sensed thereby once said data bearing means has been displaced to a position of substantial equilibrium.

8. A postage scale in accordance with claim 7 wherein said optical reading means comprises photosensitive means responsive to the reception of light transmitted thereto; and wherein said optically coded indica comprises a plurality of tracks of light and dark elements for selectively transmitting light, said light and dark elements being arranged in a coded configuration of parcel weight and each of said tracks being associated with a photosensitive means; and wherein one of said tracks is a coded representation of half-pound increments and at least another of said tracks includes light and dark elements arranged to have transitions corresponding to at least pound increments of said coded configuration of parcel weight.

9. A postage scale in accordance with claim 8 wherein said weight data generating means further comprises signal generating means coupled to the photosensitive means associated with said other track and responsive to sensed transitions for producing a first signal and to the absence of sensed transitions for a predetermined time duration for producing a second signal, said second signal representing that said data bearing means has been displaced to a position of substantial equilibrium.

10. A postage scale in accordance with claim 9 wherein said weight data generating means further comprises energizable temporary storage means for storing, when energized, the digital representation produced by said photosensitive means in response to said sensed coded indicia; driving means actuated in response to said second signal for providing relative displacement of said data bearing means with respect to said photosensitive means independently of said parcel weight; and energizing means responsive to a sensed transition at a pound increment position for supplying an energizing signal to said temporary storage means and for deactuating said driving means.

11. A postage scale in accordance with claim 10 wherein said weight data generating means further comprises half-pound signaling means coupled to the photosensitive means associated with said one track and responsive to said second signal for detecting whether said position of substantial equilibrium is above or below a half-pound increment, to thereby generate a signal representing that the parcel weight upon which postage is determined is either an integral number of pounds or includes a half-pound increment, respectively.

12. In a postage scale for providing an indication of the requisite postage for a parcel in accordance with the weight, class of shipment and destination zone of said parcel and including weight data generating means for generating a representation of the weight of said parcel upon which postage is determined, memory means for storing postage data representations for each incremental parcel weight for each class of shipment and destination zone; and means for reading out one of said stored postage data representations in accordance with a selected class of shipment, a selected destination zone and the weight of said parcel; the apparatus comprising:

data bearing means bearing coded indicia of parcel weight and being mechanically connected to a parcel weighing platform displaceable with respect to a reference position in response to the weight of a parcel loaded upon said platform;

data pick-up means defining said reference position for sensing said coded indicia; said data pick-up means being mechanically connected to expandible coupling means for adjusting the position of said data pick-up means; and calibration and drive means coupled to said data pick-up means for maintaining said data pick-up means and said data bearing means at a relative zero position with respect to each other when said platform is unloaded and for supplying said expandible coupling means with an energizing current to cause said expandible coupling means to expand within predetermined limits once said platform is loaded and said data bearing means has been displaced to a position of substantial equilibrium.

13. The apparatus of claim 12 wherein said calibration and drive means comprises calibrating means coupled to said data pick-up means and responsive to a signal representing that said platform is unloaded and that said data bearing means and said data pick-up means deviate from said relative zero position with respect to each other for supplying a calibrating current to said expandible coupling means to cause said data pick-up means to be displaced to restore said relative zero position; and means for reducing said calibrating current when said data bearing means and said data pick-up means admit of said relative zero position to thereby enable said data bearing means to deviate again from said relative zero position.

14. The apparatus of claim 13 wherein said calibrating means comprises switch means exhibiting a first state when said data bearing means deviates from said relative zero position and a second state when said data bearing means admits of said relative zero position; and current supply means coupled to said expandible coupling means for increasing said calibrating current when said switch means exhibits said first state and for decreasing said calibrating current when said switch means exhibits said second state.

15. The apparatus of claim 14 wherein said data pick-up means includes means for sensing when said platform is loaded; and wherein said switch means is enabled in response to said data pick-up means to exhibit said second state when said platform is loaded.

16. The apparatus of claim 13 wherein said data pick-up means includes means for sensing first indicia when said data bearing means deviates from said relative zero position and second indicia when said data bearing means admits of said relative zero position.

17. The apparatus of claim 12 wherein said data bearing means includes predetermined, spaced apart indicia; and wherein said calibration and drive means comprises driving means including switch means actuated when said data bearing means has been displaced to a position of substantial equilibrium in response to the loading of said platform for supplying said energizing current to said expandible coupling means; and means responsive to the sensing of one of said spaced apart indicia by said data pick-up means for thereafter deactuating said switch means.

18. A postage scale for providing an indiciation of the requisite postage for a parcel in accordance with the weight, class of shipment and destination zone of said parcel, comprising:
first manually operable switch means for generating, when operated, a signal representing a selected class of shipment;
second manually operable switch means for generating, when operated, a signal representing a selected destination zone;
encoding means coupled to said first and second switch means and responsive to said generated signals for producing a coded signal representing a destination address;
memory means having a plurality of individual storage sections corresponding to said classes of shipment, each of said storage sections including a two-dimensional array of storage locations, a first dimension being defined by said destination addresses and a second dimension being defined by weight increments, and at which storage locations postage data representations corresponding to destination zones and parcel weights are stored;
data bearing means bearing coded indicia of parcel weight and being mechanically connected to a parcel weighing platform such that said data bearing means is displaceable with respect to a reference position in response to the loading of said platform with a parcel;
data pick-up means defining said reference position for sensing said coded indicia on said data bearing means and for generating a digital representation thereof corresponding to the weight of said parcel upon which postage is determined; said data pick-up means being mechanically connected to expandible coupling means so as to be movable;
calibration and drive means coupled to said data pick-up means for maintaining a relative zero position between said data bearing means and said data pick-up means when said platform is unloaded and for supplying said expandible coupling means with an energizing current to cause said expandible coupling means to expand within predetermined limits once said platform is loaded and said data bearing means has been displaced to a position of substantial equilibrium;
means for detecting when said data pick-up means has been driven to a predetermined limit by said expandible coupling means to energize said data pick-up means to generate said digital representation of parcel weight;
means coupled to said data pick-up means for supplying said digital representation of parcel weight to all of said storage sections;
means coupled to said first switch means for selecting one of said storage sections in accordance with the generated signal representing said selected class of shipment; and
read-out means coupled to all of said storage sections for reading out the one postage data representation stored in the storage location selected by said first switch means at the location defined by the coded signal produced by said encoding means and the digital representation of said parcel weight.

19. Calibration control means for a weighing device, said weighing device including weight indicating means that is displaceable with respect to a reference position in response to the weight of an object to be weighed, comprising:
means for mechanically connecting said weight indicating means to a weight support means;
data pick-up means defining said reference position and attached to expandible coupling means, said data pick-up means detecting predetermined indicia disposed on said weight indicating means; and
calibrating current supply means coupled to said data pick-up means for selectively supplying a calibrating current to said expandible coupling means when certain indicia are sensed indicating that said weight indicating means deviates from a predetermined juxtaposition with respect to said reference position, thereby to restore said weight indicating means to said predetermined juxtaposition.

20. The calibration control means of claim 19 wherein said calibrating current supply means comprises current supply means connected to said expandible coupling means; and energizing means coupled to said current supply means and responsive to the detection of said certain indicia by said data pick-up means for energizing said current supply means to permit current to be supplied thereby to said expandible coupling means, said energizing means being further responsive to the detection of other indicia by said data pick-up means for de-energizing said current supply means.

21. The calibration control means of claim 19 further comprising means responsive to the detection of further indicia by said data pick-up means indicating that an object is being weighed to de-energize said calibrating current supply means.

22. A postage scale for providing an indication of the requisite postage for a parcel in accordance with the weight, class of shipment and destination zone of said parcel, comprising:

data bearing means bearing coded indicia of parcel weight and being mechanically connected to a parcel weighing platform such that said data bearing means is displaceable with respect to a reference position in response to the weight of a parcel loaded upon said platform;

data pick-up means disposed at said reference position for sensing said coded indicia;

drive means for causing relative displacement of said data bearing means with respect to said data pick-up means once said platform is loaded until predetermined indicia is sensed by said data pick-up means;

data generating means for generating a digital representation of parcel weight as sensed by said data pick-up means when said data bearing means has been moved to the position whereat said predetermined indicia is sensed;

memory means for storing postage data representations for each incremental parcel weight for each class of shipment and destination zone; and means for reading out and displaying postage data in accordance with a selected class of shipment, a selected destination zone and said digital representation of parcel weight.

23. A postage scale for providing an indication of the requisite postage for a parcel in accordance with the weight, class of shipment and destination zone of said parcel, comprising:

weight data generating means for generating a digital representation of the weight of said parcel upon which postage is determined;

memory means having a plurality of individual storage sections corresponding substantially to said classes of shipment, each of said storage sections including addressable storage locations comprised of plural parts for storage portions of postage data representations corresponding to destination zones and parcel weight;

first manually operable switch means for generating, when operated, a signal representing a selected class of shipment;

means coupled to said first switch means for selecting one of said storage sections in accordance with the generated signal representing said selected class of shipment;

second manually operable switch means for generating, when operated, a signal representing a selected destination zone;

address means responsive to said selected destination zone and to said parcel weight for addressing an individual storage location in each of plural storage sections; and multiplex means coupled to all of said storage sections for reading out all of the portions of a postage data representation from all of the parts of an addressed storage location in the one selected storage section in successive time intervals.

24. The postage scale of claim 23 wherein the addressable storage locations of each memory means storage section each is constituted by first and second parts whereat first and second portions, respectively, of said postage data representations are stored; and said multiplex means comprises a source of clock pulses, said clock pulses defining multiplex cycles, means for applying said clock pulses to said memory means so that, during one portion of said multiplex cycle, said first portion of said postage data representations is read out of said first part of an addressed storage location, and during a second portion of said multiplex cycle, said second portion of said postage data representations is read out of said second part of said addressed storage location, and output means coupled to said memory means for receiving said respective first and second portions of said postage data representations read out from said addressed storage location during said multiplex cycle.

25. In a memory ready-out system for reading out composite data stored at an addressable location in said memory, said addressable location comprising at least first and second parts whereat first and second portions, respectively, of said composite data are stored; multiplxing means comprising a source of clock pulses defining a multiplexing cycle; means for applying said clock pulses to said memory so that, during one portion of said multiplexing cycle, said first portion of said composite data is read out of said first part of an addressed location, and during a second portion of said multiplexing cycle said second portion of said composite data is read out of said second part of said addressed location; and output means coupled to said memory for receiving said respective first and second portions of said composite data read out from said addressed location during said multiplex cycle.

* * * * *